US010305889B2

(12) United States Patent
Huang et al.

(10) Patent No.: US 10,305,889 B2
(45) Date of Patent: May 28, 2019

(54) IDENTITY AUTHENTICATION METHOD AND DEVICE AND STORAGE MEDIUM

(71) Applicant: TENCENT TECHNOLOGY (SHENZHEN) COMPANY LIMITED, Shenzhen, Guangdong (CN)

(72) Inventors: Liang Huang, Shenzhen (CN); Yuye Wang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 346 days.

(21) Appl. No.: 15/155,303

(22) Filed: May 16, 2016

(65) Prior Publication Data

US 2016/0261586 A1 Sep. 8, 2016

Related U.S. Application Data

(63) Continuation of application No. PCT/CN2014/090595, filed on Nov. 7, 2014.

(30) Foreign Application Priority Data

Nov. 19, 2013 (CN) .......................... 2013 1 0581363

(51) Int. Cl.
  *H04L 29/06* (2006.01)
  *G06F 21/31* (2013.01)
  (Continued)

(52) U.S. Cl.
  CPC ............ *H04L 63/083* (2013.01); *G06F 21/31* (2013.01); *G06T 11/60* (2013.01); *H04L 63/08* (2013.01);
  (Continued)

(58) Field of Classification Search
  CPC ....... H04L 63/083; H04L 63/08; G06F 21/31; G06F 3/023; G06F 3/041; G06T 11/60
  See application file for complete search history.

(56) References Cited

U.S. PATENT DOCUMENTS

| | | | | |
|---|---|---|---|---|
| 2004/0042641 A1* | 3/2004 | Jakubowski | ....... | G07C 9/00079 382/115 |
| 2005/0138376 A1* | 6/2005 | Fritz | ....................... | G06F 21/31 713/168 |

(Continued)

FOREIGN PATENT DOCUMENTS

| | | |
|---|---|---|
| CN | 102164137 A | 8/2011 |
| CN | 103093138 A | 5/2013 |

(Continued)

OTHER PUBLICATIONS

Wang et al. CAPTCHA Challenge Tradeoffs: Familiarity of Strings versus Degradation of Images, Aug. 2006, 18th International Conference on Pattern Recognition, pp. 164-167 (Year: 2006).*

(Continued)

*Primary Examiner* — Kenneth W Chang
(74) *Attorney, Agent, or Firm* — Harness, Dickey & Pierce, P.L.C.

(57) ABSTRACT

An identity authentication method and device and a storage medium are disclosed, and the method includes: receiving a CAPTCHA code acquiring request from a user equipment; randomly selecting a CAPTCHA code and a password corresponding thereto as per the request, the CAPTCHA code comprising a first CAPTCHA image formed by a plurality of spliced sub-images, and the password comprising a preset processing rule for the sub-images; sending the CAPTCHA code and password to the user equipment, so that the user equipment rearranges positions of the sub-images to form a second CAPTCHA image and presents the second CAPTCHA image to a user; and receiving, from the user equipment, authentication response information inputted by a user according to the second CAPTCHA image, authenticating an identity of the user according to the (Continued)

authentication response information, and returning an authentication result to the user equipment.

16 Claims, 10 Drawing Sheets

(51) Int. Cl.
*G06T 11/60* (2006.01)
*G06F 3/023* (2006.01)
*G06F 3/041* (2006.01)
*G06F 3/16* (2006.01)

(52) U.S. Cl.
CPC .............. *G06F 3/023* (2013.01); *G06F 3/041* (2013.01); *G06F 3/167* (2013.01); *G06F 2221/2133* (2013.01); *H04L 2463/082* (2013.01)

(56) References Cited

U.S. PATENT DOCUMENTS

| | | | |
|---|---|---|---|
| 2007/0250920 A1* | 10/2007 | Lindsay | G06F 21/31 726/7 |
| 2011/0029902 A1* | 2/2011 | Bailey | G06F 21/36 715/764 |
| 2011/0202994 A1* | 8/2011 | Hicks | G06F 21/316 726/19 |
| 2012/0011564 A1* | 1/2012 | Osborn | G06F 21/36 726/2 |
| 2013/0036457 A1* | 2/2013 | Vandemar | G06F 21/31 726/4 |
| 2013/0047231 A1 | 2/2013 | Xiao et al. | |
| 2013/0191289 A1* | 7/2013 | Cronic | G06Q 20/40 705/67 |

FOREIGN PATENT DOCUMENTS

| | | |
|---|---|---|
| CN | 103106631 A | 5/2013 |
| CN | 103179092 A | 6/2013 |
| WO | WO-2013025995 A1 | 2/2013 |

OTHER PUBLICATIONS

International Search Report and Written Opinion of the ISA for PCT/CN2014/090595, ISA/CN, Haidian District, Beijing, dated Feb. 27, 2015.
First Chinese Office Action regarding Application No. 201310581363.4 dated Jun. 3, 2016.

* cited by examiner

IDENTITY AUTHENTICATION METHOD AND DEVICE AND STORAGE MEDIUM

CROSS REFERENCE TO RELATED APPLICATION

This application is a continuation application of International Application No. PCT/CN2014/090595, titled "IDENTITY AUTHENTICATION METHOD AND DEVICE AND STORAGE MEDIUM", filed on Nov. 7, 2014, which claims priority to Chinese Patent Application No. 201310581363.4, filed on Nov. 19, 2013 and entitled "IDENTITY AUTHENTICATION METHOD AND DEVICE", the disclosures of both of which are incorporated herein by reference in their entirety.

TECHNICAL FIELD

The present disclosure relates to the field of computer network technologies, especially to an identity authentication method and device and a storage medium.

BACKGROUND

With the increasing popularity of computers and computer networks, the Internet has penetrated various aspects of work, study and daily life. The development of the network brings convenience as well as various challenges to people. For example, the use of automatons illegally consumes huge network resources, for example to send mass spams, thereby lowering the efficiency of the server. In another example, certain programs are used to continuously send out service request responses to break down the server by saturation attacks. In still another example, brute-force means is taken to maliciously crack passwords. In order to prevent the above malicious behaviors, it is essential to design a tool that enables the computer to automatically distinguish whether information comes from legitimate users or the maliciously used automaton programs.

Presently, Completely Automated Public Turing test to tell Computers and Humans Apart (CAPTCHA) codes are typically employed to distinguish whether a network user is a program or human being. The CAPTCHA code is represented by an image containing a string. In authenticating the CAPTCHA code, the user is required to input the string. The string is typically formed by uppercase and lowercase letters, and digits. Some CAPTCHA code may contain Chinese characters or a mathematical formula. The length of the string may be variable or constant. In order to prevent the CAPTCHA code from being automatically recognized by the automaton, the background of the image modified, for example by adding a texture pattern to the background of the image, to interfere the automatic recognition of the automaton.

However, once enough samples are collected, and the collected samples are learned by the automaton via a character recognizing technology to train the automaton, a computer program can be developed to decode the CAPTCHA codes. Even the improved CAPTCHA codes can also be recognized by the automaton if the library of the backgrounds of the images is not abundant enough. Therefore, the conventional CAPTCHA code cannot avoid thus problem. Taking a CAPTCHA code containing characters as an example, maximum 62 characters can be used if the uppercase and lowercase letters and digits are available for the CAPTCHA code. Therefore, the conventional CAPTCHA codes have poor anti-decryption ability and low security.

In order to improve the anti-decryption ability of the CAPTCHA codes, a clicking type CAPTCHA code (a password of which is inputted by clicking) emerges. In the use of the clicking type CAPTCHA code, a plurality of images each showing a natural object and prompt information related to content of the images are presented, so that the user is allowed to select among the images according to the prompt information by clicking, and the user identity can be verified according to the selection made by the user. The difficulty for decrypting the clicking type CAPTCHA code is dramatically increased because it is difficult for the automaton to understand the prompt information and to classify the natural objects.

However, when the clicking type CAPTCHA code is used, a number of images are delivered from the server at one time. Further, during the authentication based on the clicking type CAPTCHA code, the server may receive more than one CAPTCHA code acquiring request from the user equipment, thus causing a high workload to the server and also negatively affecting identity authentication efficiency.

SUMMARY

Embodiments of the present invention provide an identity authentication method and device and a storage medium, to avoid the high pressure of the server generated by sending a plurality of images to the user equipment for the purpose of identity authentication based on the clicking type CAPTCHA code, thereby improving the identity authentication efficiency.

Therefore, an embodiment of the present disclosure provides an identity authentication method, which is performed by a server and includes: receiving a CAPTCHA code acquiring request from a user equipment; randomly selecting a CAPTCHA code and a password corresponding to the selected CAPTCHA code as per the CAPTCHA code acquiring request, where the CAPTCHA code includes a first CAPTCHA image formed by a plurality of spliced sub-images, and the password includes a preset processing rule for the plurality of sub-images; sending the selected CAPTCHA code and password to the user equipment, so that the user equipment rearranges positions of the plurality of sub-images of the first CAPTCHA image in the CAPTCHA to form a second CAPTCHA image according to the preset processing rule contained in the password and presents the second CAPTCHA image to a user; and receiving, from the user equipment, authentication response information inputted by a user according to the second CAPTCHA image, authenticating an identity of the user according to the authentication response information, and returning an authentication result to the user equipment.

An embodiment of the present disclosure further provides an identity authentication method, which is performed by a user equipment and includes: sending a CAPTCHA code acquiring request to a server; receiving a CAPTCHA code and a password corresponding to the CAPTCHA code from a server, where the CAPTCHA code includes a first CAPTCHA image formed by a plurality of spliced sub-images, and the password includes a preset processing rule for the plurality of sub-images; rearranging positions of the plurality of sub-images of the first CAPTCHA image in the CAPTCHA code to form a second CAPTCHA image according to the preset processing rule contained in the password and presenting the second CAPTCHA image to a user; and sending authentication response information inputted by the user according to the second CAPTCHA image to the server for authenticating.

Correspondingly, an embodiment of the present disclosure further provides an identity authentication device running on a server, and the device includes: a request receiving module configured to receive a Completely Automated Public Turing test to tell Computers and Humans Apart (CAPTCHA) code acquiring request from a user equipment; a CAPTCHA code selecting module configured to randomly select a CAPTCHA code and a password corresponding to the selected CAPTCHA code as per the CAPTCHA code acquiring request, where the CAPTCHA code includes a first CAPTCHA image formed by a plurality of spliced sub-images, and the password includes a preset processing rule for the plurality of sub-images; a CAPTCHA code sending module configured to send the selected CAPTCHA code and password to the user equipment, so that the user equipment rearranges positions of the plurality of sub-images of the first CAPTCHA image in the CAPTCHA to form a second CAPTCHA image according to the preset processing rule contained in the password and presents the second CAPTCHA image to a user; and a CAPTCHA authenticating module configured to receive, from the user equipment, authentication response information inputted by a user according to the second CAPTCHA image, authenticate an identity of the user according to the authentication response information, and return an authentication result to the user equipment.

Correspondingly, an embodiment of the present disclosure further provides an identity authentication device running on a user equipment, and the device includes: a request sending module configured to send a CAPTCHA code acquiring request to a server; a CAPTCHA code receiving module configured to receive a CAPTCHA code and a password corresponding to the CAPTCHA code, where the CAPTCHA code includes a first CAPTCHA image formed by a plurality of spliced sub-images, and the password includes a preset processing rule for the plurality of sub-images; a CAPTCHA image reassembling module configured to rearrange positions of the plurality of sub-images of the first CAPTCHA image in the CAPTCHA code to form a second CAPTCHA image according to the preset processing rule contained in the password and present the second CAPTCHA image to a user; and an authentication response information sending module configured to send authentication response information inputted by the user according to the second CAPTCHA image to the server for authenticating.

Correspondingly, an embodiment of the present disclosure further provides a storage medium including computer-executable instructions configured to perform an identity authentication method when executed by a computer processor on a server, and the method includes: receiving a CAPTCHA code acquiring request from a user equipment; randomly selecting a CAPTCHA code and a password corresponding to the selected CAPTCHA code as per the CAPTCHA code acquiring request, where the CAPTCHA code includes a first CAPTCHA image formed by a plurality of spliced sub-images, and the password includes a preset processing rule for the plurality of sub-images; sending the selected CAPTCHA code and password to the user equipment, so that the user equipment rearranges positions of the plurality of sub-images of the first CAPTCHA image in the CAPTCHA to form a second CAPTCHA image according to the preset processing rule contained in the password and presents the second CAPTCHA image to a user; and receiving, from the user equipment, authentication response information inputted by a user according to the second CAPTCHA image, authenticating an identity of the user according to the authentication response information, and returning an authentication result to the user equipment.

Correspondingly, an embodiment of the present disclosure further provides a storage medium including computer-executable instructions configured to perform an identity authentication method when executed by a computer processor on a user equipment, and the method includes: sending a CAPTCHA code acquiring request to a server; receiving a CAPTCHA code and a password corresponding to the CAPTCHA code from a server, where the CAPTCHA code includes a first CAPTCHA image formed by a plurality of spliced sub-images, and the password includes a preset processing rule for the plurality of sub-images; rearranging positions of the plurality of sub-images of the first CAPTCHA image in the CAPTCHA code to form a second CAPTCHA image according to the preset processing rule contained in the password and presenting the second CAPTCHA image to a user; and sending authentication response information inputted by the user according to the second CAPTCHA image to the server for authenticating.

As such, in an embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 rearranges the positions of the plurality of sub-images forming the first CAPTCHA image in the CAPTCHA code according to the preset processing rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200.

BRIEF DESCRIPTION OF THE DRAWINGS

To describe technical schemes in embodiments of the present invention more clearly, accompanying drawings for the description of the embodiments will be introduced briefly below. Obviously, the accompanying drawings for the description below illustrate only some embodiments of the present invention, and those of ordinary skills in the art can also obtain other drawings in light of the accompanying drawings without creative work.

DETAILED DESCRIPTION OF THE EMBODIMENTS

In order to further describe the technical schemes and the advantages of the disclosure, the embodiments, methods, steps, structures, features, and functions of the identity authentication method and device and storage medium will be further described in detail below in conjunction with the accompanying drawings.

The preceding or other technical content, features, and advantages of the disclosure will become apparent in the detailed description of the preferred embodiment in conjunction with the accompanying drawings below. The accompanying drawings are provided for reference and description, but not for limiting the disclosure.

Figure 1:
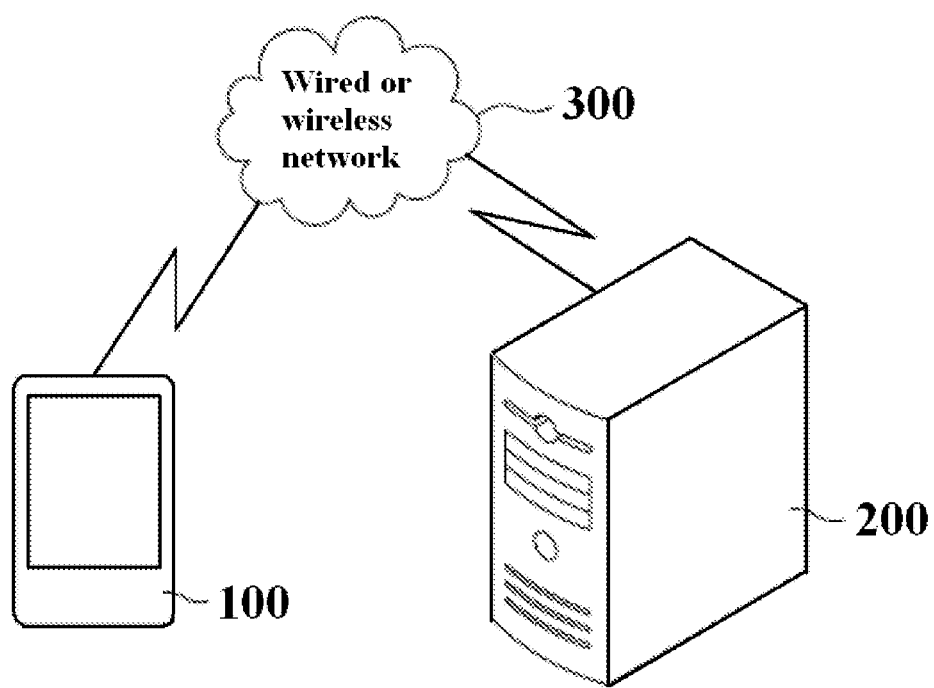
FIG. 1 is a schematic diagram showing an environment of an identity authentication method according to an embodiment of the disclosure.

FIG. 1 is a schematic diagram showing an environment of an identity authentication method according to an embodiment of the disclosure. As shown in FIG. 1, a user equipment 100 and a server 200 are located in a wired or wireless network 300, and the user equipment 100 and the server 200 can communicate with each other through the wired or wireless network 300.

The user equipment 100 may be a smart phone, a tablet computer, an e-book reader, a music player, a laptop portable computer, a desktop computer, a smart set-top box, and so on.

Figure 2:
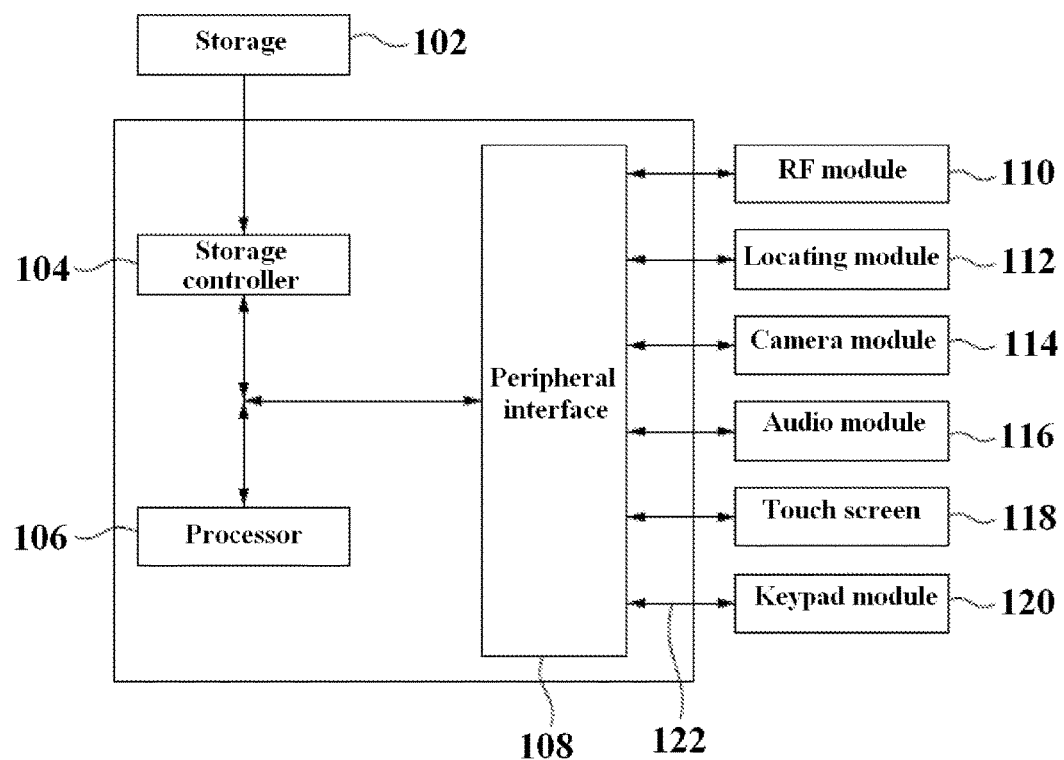
FIG. 2 is a schematic structural diagram of a user equipment.

FIG. 2 is a schematic structural diagram of the user equipment 100. As shown in FIG. 2, the user equipment 100 includes a storage 102, a storage controller 104, one or more processors 106 (only one processor 106 is shown in FIG. 2), a peripheral interface 108, a radio frequency (RF) module 110, a locating module 112, a camera module 114, an audio module 116, a touch screen 118, and a keypad module 120, all of which may be in communication with each other through one or more communication buses or signal lines 122.

It should be understood that the structure shown in FIG. 2 just schematically illustrate the structure of the user equipment 100. Actually, the user equipment 100 may include more or less modules than those shown in FIG. 2 or have a different configuration from the configuration shown in FIG. 2. The modules shown in FIG. 2 can be achieved by software or hardware or a combination of software and hardware.

The storage 102 is configured to store software programs and modules, such as program instructions or modules in the user equipment 100 which are used for implementing the identity authentication method and device. By running the software programs and modules stored in the storage 102, The processor 106 performs various functions, applications, and data processes, thereby implementing the identity authentication method in the user equipment 100.

The storage 102 may be a high speed Random Access Memory (RAM), or a Non-volatile memory (NVM), such as a magnetic storage device, a flash memory, or other Non-volatile memories. In some implementations, the storage 102 further includes a remote storage arranged separately from the processor 106, and the remote storage may be connected to the user equipment 100 via a network which, for instance, includes but is not limited to the Internet, an enterprise intranet, a local area network (LAN), a mobile communication network, or a combination of the above. The access to the storage 102 by the processor 106 or other modules is under the control of the storage controller 104.

The peripheral interface 108 is configured to couple various input/output devices to a CPU or the storage 102. The processor 106 runs various software or instructions stored in the storage 102 to perform various functions of the user equipment 100.

In some embodiments, the peripheral interface 108, the processor 106, and the storage controller 104 can be built into a single chip, or be respectively built in separate chips in other embodiments.

The RF module 110 is configured to receive and send electromagnetic signals, and transform the electromagnetic signals to electric signals or transform the electric signals to the electromagnetic signals, for the communication with a communicating network or other devices. The RF module 110 includes various known circuit elements for communication, such as an antenna, an RF transceiver, a digit signal processor, an encryption/decryption chip, a Subscriber Identity Module (SIM) card, and a storage. The RF module 110 can communicate with various networks, such as the Internet, an enterprise intranet, or a wireless network, or communicate with other devices via the wireless network. The wireless network may be a cellular phone network, a wireless local-area network (WLAN), or a metropolitan area network (MAN). The wireless network can adopt various communication standards, protocols, and technology, including but being not limited to Global System for Mobile Communication (GSM), Enhanced Data GSM Environment (EDGE), wideband code division multiple access (W-CDMA), Code division access (CDMA), time division multiple access (TDMA), Bluetooth, Wireless Fidelity (WiFi) (such as Institute of Electrical and Electronics Engineers (IEEE) 802.11a, IEEE 802.11b, IEEE 802.11g and/or IEEE 802.11n), a Voice over Internet Protocol (VoIP), Worldwide Interoperability for Microwave Access (Wi-Max), other protocols used for email, instant message, and short message, or other suitable communication protocols, and even including future protocols.

The locating module 112 is configured to obtain the current location of the user equipment 100. The locating module 112 for instance may be, but is not limited to, a global satellite navigation system (GPS), or may adopt a locating technology based on WLAN or mobile communication network.

The camera module 114 is configured to capture images or videos. The captured images or videos may be stored to the storage 102 and sent via the RF module 110.

The audio module 116 is configured to provide an audio interface for the user and includes one or more microphones, one or more speakers, and an audio circuit. The audio circuit is configured to receive audio data from the peripheral interface 108 and transform the audio data to an electric signal, and then transmit the electric signal to the speaker. The speaker transforms the electric signal to sound waves which are audible by human ears. The audio circuit is further configured to receive an electric signal from the microphone, transform the electric signal to the audio data, and transmit the audio data to the peripheral interface 108 for further processing. The audio data can be obtained from the storage 102 or via the RF module 110. Additionally, the audio data may be stored to the storage 102 or sent by RF module 110. In some cases, the audio module 116 further includes a headphone jack which is an audio interface for earphones or other devices.

The touch screen 118 provides both an output interface and an input interface between the user equipment 100 and the user. Specifically, the touch screen 118 displays outputs to the user. The content of the outputs may be text, images, videos or any combination of the above, also some output content corresponds to some user interface objects. The touch screen 118 further receives inputs from the user, such as gesture operations like clicking, sliding, etc. of the user, so that the user interface objects can respond to the inputs from the user. The technology for detecting the inputs from the user may be a resistive or capacitive touch detecting technology or any other possible touch detecting technology. The touch screen 118 for instance may be, but is not limited to, a liquid-crystal display (LCD) or a light-emitting polymer display.

The keypad module 120, which acts as an input interface for the user to perform inputs to the user equipment 100, may be used by the user to press various keys to trigger the user equipment 100 to perform different functions.

Figure 3:
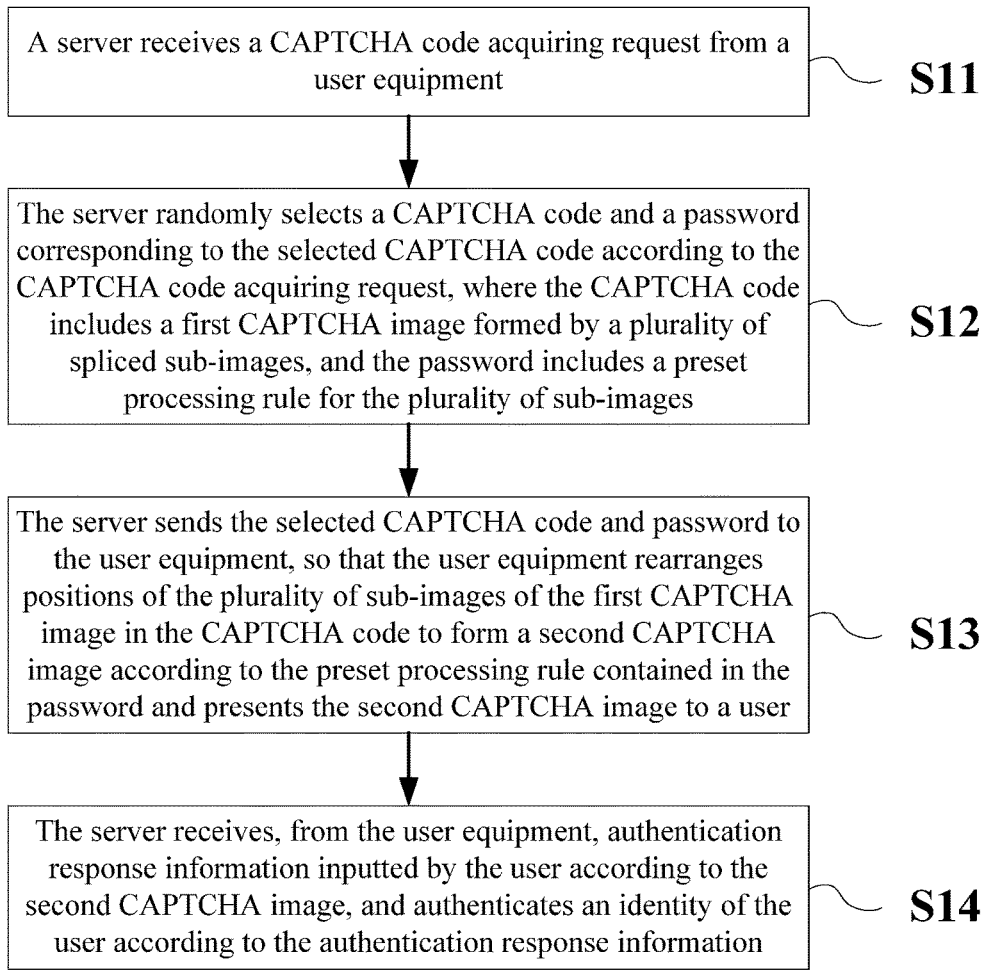
FIG. 3 is a schematic flow chart of the identity authentication method according to a first embodiment of the disclosure.

FIG. 3 is a schematic flow chart of the identity authentication method according to a first embodiment of the disclosure. The first embodiment illustrates a process flow of the server 200. The identity authentication method of the first embodiment includes Steps S11 to S13 below.

At Step S11, the server 200 receives a CAPTCHA code acquiring request from the user equipment 100.

In this step, the user equipment 100 sends the CAPTCHA code acquiring request to a preconfigured server 200, such as an electronic device corresponding to a webpage address, to obtain a CAPTCHA code. Specifically, the CAPTCHA code acquiring request carries a page identifier (e.g. a check code of a webpage) for uniquely identifying a webpage, and the page identifier, which corresponds to the CAPTCHA code acquiring request, may be composed by digits and may be changed each time when the webpage is refreshed.

At Step S12, the server 200 randomly selects a CAPTCHA code and a password corresponding to the selected CAPTCHA code according to the CAPTCHA code acquiring request. The CAPTCHA code includes a first CAPTCHA image which is formed by splicing a plurality of sub-images. The password includes a preset processing rule for the plurality of sub-images.

In the embodiment, a plurality of CAPTCHA codes and passwords respectively corresponding to the CAPTCHA codes can be pre-stored in the server 200, and the first CAPTCHA image contained in each CAPTCHA code is an image formed by splicing a plurality of sub-images. Additionally, in the case of a CAPTCHA code containing prompt information, the sub-images contained in the first CAPTCHA image are sub-images associated with the prompt information in a pre-built sub-image database.

The preset processing rule in the password refers to a rule for rearranging the positions of the plurality of sub-images forming the first CAPTCHA image. The preset processing rule can be designed according to the specific way of splicing the plurality of sub-images into the first CAPTCHA image and an expected form of presenting the plurality of sub-images in the user equipment 100. For example, if the plurality of sub-images forming the first CAPTCHA image are symmetrically arranged along a symmetry axis, the preset processing rule is to turn over the first CAPTCHA image about the symmetry axis; and if the plurality of sub-images contained in the first CAPTCHA image are numerous and are easily to be divided, the preset processing rule may include a dividing rule and an arranging rule for the plurality of sub-images. In other implementations, other preset processing rules may be employed to process the plurality of sub-images of the first CAPTCHA image, without departing from the protection scope of the disclosure.

The password in the present embodiment refers to date obtained from encrypting the preset processing rule. Therefore, each password corresponds to one preset processing rule, and two different passwords may correspond to one or two preset processing rules. For example, if a first password corresponds to a first preset processing rule, a second password different from the first preset processing rule corresponds to a second preset processing rule, the first preset processing rule and the second preset processing rule, which are related to different first CAPTCHA images, may be the same or different. The password may be encrypted or decrypted by a symmetric encryption or decryption manner commonly used in the Internet to ensure the security of the transmission of the password. Due to the rapid speed in encrypting and decrypting the password, the encryption and decryption of the password will not affect the performance efficacy and effect of the whole system.

At Step S13, the server 200 sends the selected CAPTCHA code and password to the user equipment 100, so that the user equipment 100 rearranges positions of the plurality of sub-images forming the first CAPTCHA image in the CAPTCHA code according to the preset processing rule contained in the password to form a second CAPTCHA image and then presents the second CAPTCHA image to a user.

At Step S14, the server 200 receives, from the user equipment 100, authentication response information that is inputted by the user according to the second CAPTCHA image, and authenticates an identity of the user according to the authentication response information.

In the embodiment, after receiving the authentication response information, the sever 200 obtains authentication answer information corresponding to the first CAPTCHA image and the password sent for the authentication and then compares the authentication answer information with the received authentication response information, to authenticate the identity of the user according to the comparison result.

Herein, the process of obtaining the authentication answer information particularly includes: calculating the authentication answer information in real time from the CAPTCHA code and the password sent for the authentication; or directly reading the authentication answer information that is pre-stored locally in the server 200 and corresponds to the CAPTCHA code and the password sent for the authentication.

In the embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 rearranges the positions of the plurality of sub-images forming the first CAPTCHA image in the CAPTCHA code according to the preset processing rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200.

Figure 4:
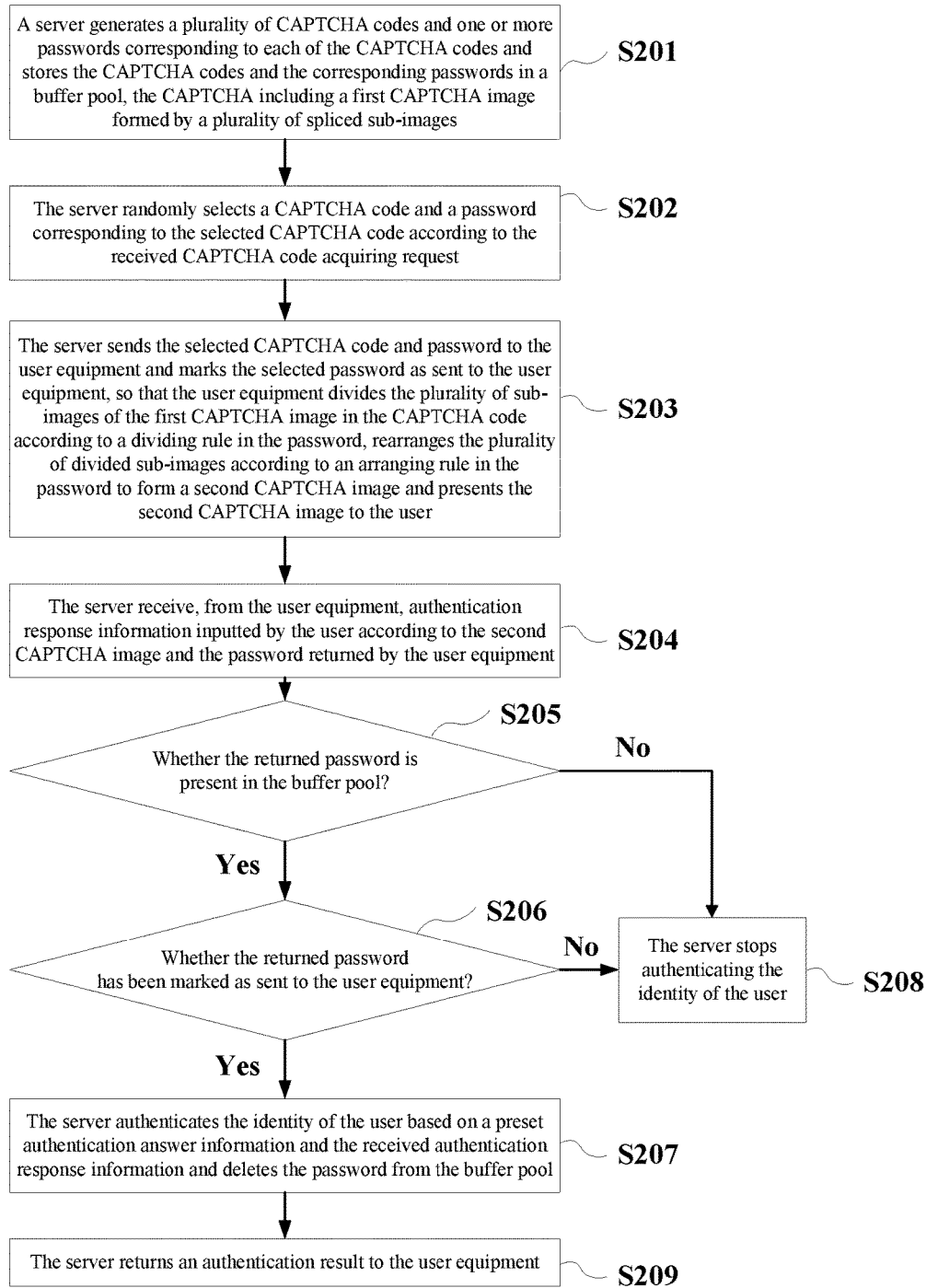
FIG. 4 is a schematic flow chart of the identity authentication method according to a second embodiment of the disclosure.

FIG. 4 is a schematic flow chart of the identity authentication method according to a second embodiment of the disclosure. In conjunction with FIG. 1, the second embodiment discloses a process flow performed at the server 200. Based on the first embodiment, the second embodiment adds a step of generating a plurality of CAPTCHA codes and the passwords corresponding to the plurality of CAPTCHA codes and a step of marking the passwords. The identity authentication method according to the second embodiment includes Steps S201 to S205 below.

At Step S201, the server 200 generates a plurality of CAPTCHA codes and one or more passwords corresponding to each of the CAPTCHA codes, and storing the plurality of the CAPTCHA codes and the corresponding passwords in a buffer pool. The CAPTCHA code includes a first CAPTCHA image formed by a plurality of spliced sub-images, and the password includes a preset processing rule for the plurality of sub-images.

The manner of splicing the plurality of sub-images to form the first CAPTCHA image is not limited. For example, all the sub-images may be arranged on a single line and spliced to form the first CAPTCHA image in a strip shape; or all the sub-images may be arranged as a n×m or n×n matrix, where n is an integer greater than 1, m is an integer greater than 1, and n is unequal to m. For example, if there are 9 sub-images, the sub-images can be spliced to form a 3×3 sudoku image. In other implementations, other splicing manners can be used to splice the sub-images without departing from the protection scope of the disclosure.

At Step S202, upon receiving a CAPTCHA code acquiring request from the user equipment, the server 200 randomly selects a CAPTCHA code and a password corresponding to the selected CAPTCHA code according to the CAPTCHA code acquiring request.

In this step, the server 200 checks whether the selected password has been marked as sent to the user equipment (that is, whether the selected password has been sent to the user equipment and used for identity authentication). The password corresponding to the CAPTCHA code will not be used if having been marked as sent to the user equipment, that is, only a password having not been marked as sent to the user equipment is selected.

The server 200 randomly selects a CAPTCHA code and a password corresponding to the selected CAPTCHA code by:

randomly selecting a CAPTCHA code from the buffer pool, and randomly selecting one among all passwords corresponding to the selected CAPTCHA code and stored in the buffer pool; and determining whether the selected password is marked as sent to the user equipment, and if the selected password is marked as sent to the user equipment, randomly selecting another password corresponding to the selected CAPTCHA code from the buffer pool, until a password having not been marked as sent to the user equipment is selected.

At Step S203, the server 200 sends the selected CAPTCHA code and password to the user equipment 100 and marks the selected password as sent to the user equipment.

The user equipment 100 divides the plurality of sub-images of the first CAPTCHA image in the CAPTCHA code according to a dividing rule in the password, rearranges the plurality of divided sub-images according to an arranging rule in the password to form a second CAPTCHA image, and presents the second CAPTCHA image to the user.

At Step S204, the server 200 receives, from the user equipment 100, authentication response information inputted according to the second CAPTCHA image by the user and the password returned by the user equipment 100.

At Step S205, the server 200 searches for the password returned by the user equipment 100 in the buffer pool.

If the password is searched out in the buffer pool, Step S206 is performed to check whether the password has been marked as sent to the user equipment. If the password has been marked as sent to the user equipment, Step S207 is performed to authenticate the identity of the user based on preset authentication answer information and the authentication response information inputted by the user and delete the password from the buffer pool; and if the password has not been marked as sent to the user equipment, Step S208 is performed to stop authenticating the identity of the user.

If the password is not searched out in the buffer pool, Step S208 is also performed to stop authenticating the identity of the user.

Step S209 is performed to return an authentication result to the user equipment 100 after the identity authentication of the user is finished.

In the present embodiment, the password sent to the user equipment is marked in the buffer pool as sent to the user equipment, so that the password will not be repeatedly sent to the user equipment. After receiving the authentication response information and the password returned by the user equipment 100, the server 200 searches for the returned password in the buffer pool to determine whether the password returned by the user equipment 100 presents in the buffer pool, and further determine whether the password has been marked as sent to the user equipment if the returned password presents in the buffer pool. Otherwise, if the password returned by the user equipment 100 does not present in the buffer pool or is not marked as sent to the user equipment, the server 200 will not authenticate the identity of the user, namely, the server 200 rejects to authenticate the identity of the user. The sever 200 authenticates the identity of the user according to the preset authentication answer information and the authentication response information only when the password returned by the user equipment 100 presents in the buffer pool and has been marked as sent to the user equipment. Regardless of whether the authentication is passed, the password will be deleted to ensure that the password is a one-off password (i.e. a disposable password).

Additionally, replay attacks (also known as playback attacks) by automaton or human being can be defended effectively because the password is disposable. Nowadays, the replay attack is commonly used means for decrypting the password. Considering features such as a low generating speed, repeated usage, and long valid time (a period from the time when the server 200 sends the CAPTCHA code to the time when the CAPTCHA code is deleted or prevented from being sent) of a single CAPTCHA code containing a plurality of images (e.g. a clicking type CAPTCHA code), the CAPTCHA code and the correct authentication response information corresponding to the CAPTCHA code are collected, and then submitted repeatedly to cheat the server 200. Such replay attack is easy to conduct and has a great damage. In the identity authentication method of the present embodiment where the password corresponding to the CAPTCHA code is a one-off password, before authenticating the identity of the user, the server 200 determines whether the password presents in the buffer pool and further determines whether the password has been marked as sent to the user equipment if the password presents in the buffer pool, as such, the server 200 does not authenticate the identity of the user if the password does not present or has not been marked as sent to the user equipment, thereby rejecting the authenticating. As such, the replay attack can be avoided by a different password even the first CAPTCHA image or the preset processing rules (e.g. the dividing rule or the arranging rule) in the passwords sent to the user equipment remain unchanged.

It should be noted that all the steps in the present embodiment can be performed by one server or a number of servers. For example, a CAPTCHA code generating server may be configured to generate CAPTCHA codes, a CAPTCHA image splicing server may be configured to splice a plurality of sub-images to form the first CAPTCHA image, a password generating server may be configured to generate a password corresponding to the CAPTCHA code, a CAPTCHA code sending server may be configured to send the CAPTCHA code, and so on. Accordingly, the first CAPTCHA image, the password, and the sub-images may be respectively placed in different buffer pools, and the number of the servers and the configuration of the buffer pools may be varied with the specific environment and the specific conditions, without departing from the protection scope of the present disclosure.

In the embodiment of the disclosure, after receiving the CAPTCHA code acquiring request, the sever 200 randomly selects a CAPTCHA code containing a first CAPTCHA image formed by a plurality of spliced sub-images and a password corresponding to the CAPTCHA code, and sends the CAPTCHA code and the password to the user equipment 100, so that the user equipment 100 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200. In addition, the password is disposable, the replay attack can be effectively resisted.

Figure 5:
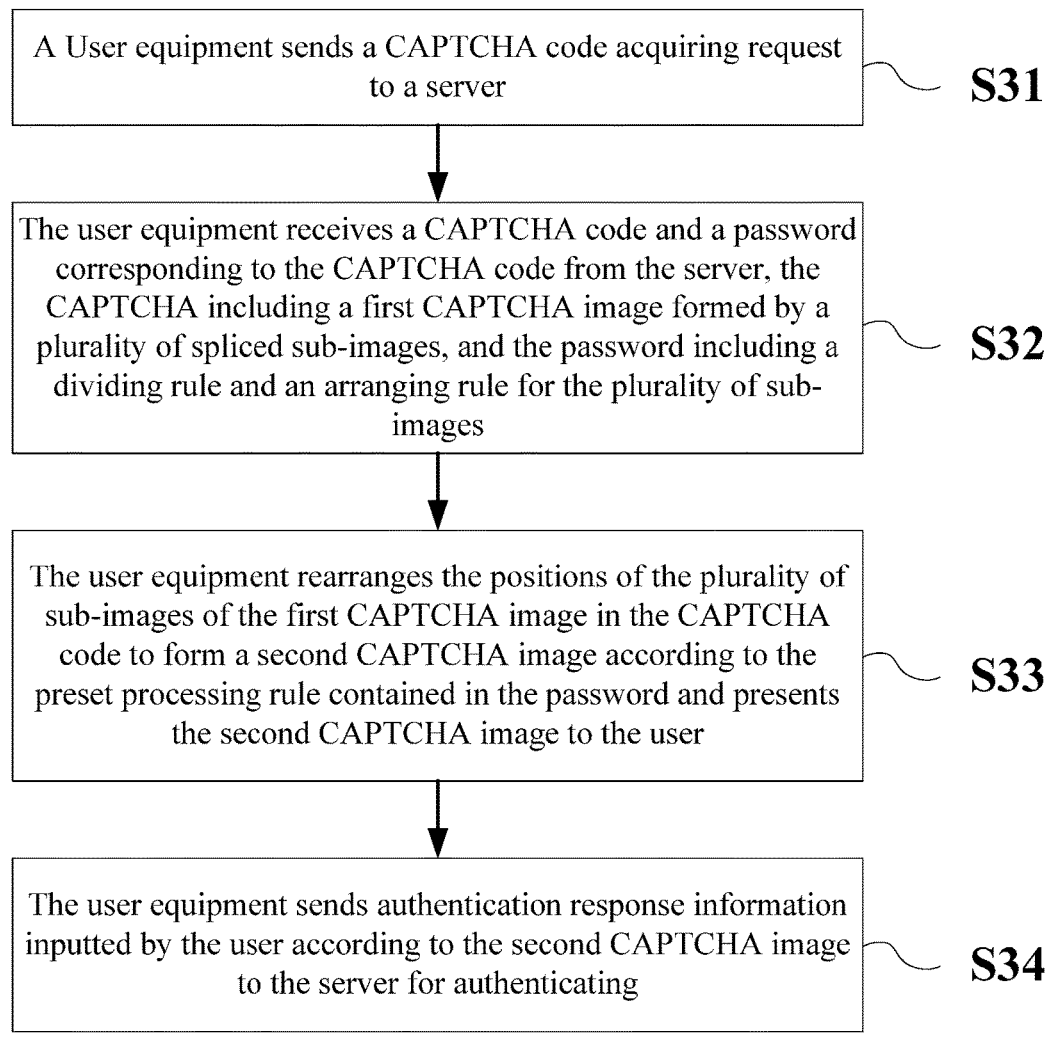
FIG. 5 is a schematic flow chart of the identity authentication method according to a third embodiment of the disclosure.

FIG. 5 is a schematic flow chart of the identity authentication method according to a third embodiment of the disclosure. In conjunction with FIG. 1, the third embodiment illustrates a process flow conducted at the user equipment 100. The identity authentication method in the third embodiment can cooperate with the identity authentication method performed by the server 200 in the first embodiment or the second embodiment. The identity authentication method in the third embodiments includes Steps S31 to S34 below.

At Step S31, a user equipment 100 sends a CAPTCHA code acquiring request to a server 200.

Ate Step S32, the user equipment 100 receives a CAPTCHA code and a password corresponding to the CAPTCHA code from the server 200. The CAPTCHA code includes a first CAPTCHA image formed by a plurality of spliced sub-images, and the password includes a preset processing rule for the plurality of sub-images.

At Step S33, the user equipment 100 rearranges the positions of the plurality of sub-images of the first CAPTCHA image of the CAPTCHA code to form a second CAPTCHA image according to the preset processing rule in the password, and presents the second CAPTCHA image to the user.

At Step S34, the user equipment 100 sends authentication response information inputted by the user according to the second CAPTCHA image to the server 200 for authenticating.

In the embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 rearranges the positions of the plurality of sub-images forming the first CAPTCHA image according to the preset processing rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200.

Figure 6:
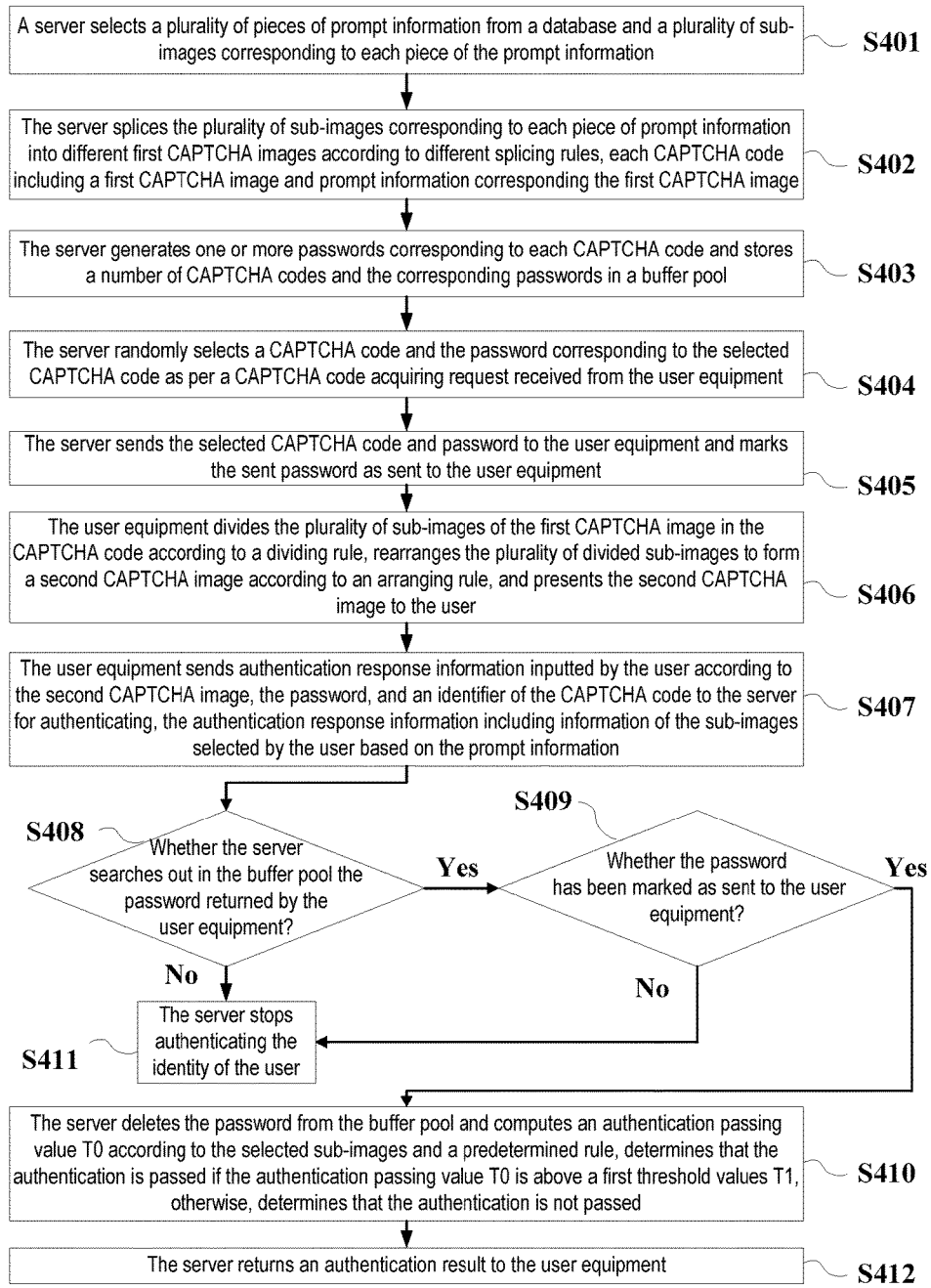
FIG. 6 is a schematic flow chart of the identity authentication method according to a fourth embodiment of the disclosure.

FIG. 6 is a schematic flow chart of an identity authentication method according to a fourth embodiment of the disclosure. In conjunction with FIG. 1, the fourth embodiment illustrates an interactive flow between the user equipment and the server. In this embodiment, a clicking type CAPTCHA code is taken for example to describe the disclosure, and the identity authentication method of the present embodiment includes Steps S401 to S412 described below.

At Step S401, the server 200 selects a plurality of pieces of prompt information from a database, and selects a plurality of sub-images corresponding to each piece of the prompt information.

The database includes a plurality of prompt information samples and a plurality of sub-image samples. Each of the plurality of sub-image samples is provided with mapping types, where each prompt information sample corresponds to one of the mapping types.

The database is prebuilt and preconfigured in the server 200. The plurality of prompt information samples and the plurality of sub-image samples in the database may be obtained from the Internet by the server 200, or may be made by designers. The implementations of the present disclosure are not limited to the ways described above.

The prompt information samples preferably are questions which are easily understood by users, such as choice questions related to common sense. The sub-image samples preferably contain content that can be recognized rapidly by users. Preferably, images of physical objects are taken as the sub-image samples, because in one aspect the images of the sub-image samples are readily available in the Interface, and in another aspect the images of the physical objects can effectively improve the anti-decryption ability of the CAPTCHA code. Under the present computer development level, it is difficult to train a universal classifying program for a certain kind of physical objects. For example, if there are two pictures of cars are taken for samples, since many aspects, such as sizes, colors, decorations, and angles, of the cars may be greatly different, it is difficult to finish a clustering process for these two samples if machine leaning means is used for classifying, therefore taking the images of the physical object as the sub-image samples can effectively improve the anti-decryption ability of the CAPTCHA code.

Each prompt information sample may correspond to a prompt information identifier for uniquely identifying the prompt information sample. Each sub-image sample may also correspond to a sub-image identifier for uniquely identifying the sub-image sample.

In building the database, the mapping type of each sub-image sample, which corresponds to each prompt information sample, needs to be defined. For example, if there are M prompt information samples and N sub-image samples, M×N times of mappings are defined, where M and N are natural numbers. The initial mappings may be performed manually.

There may be four mapping types of the sub-image samples, namely, a first mapping type, a second mapping type, a third mapping type, and a fourth mapping type.

For example, the first mapping type may be defined as "YES", thus if the mapping type of a sub-image sample, that corresponds to a prompt information sample, is the first mapping type, the user is required to click the sub-image (i.e. the sub-image sample) during authentication based on the clicking type CAPTCHA code accompanied by prompt information which is the prompt information sample, that is, the sub-image matches the prompt information.

For example, the second mapping type may be defined as "NO", thus if the mapping type of a sub-image sample, that corresponds to a prompt information sample, is the second mapping type, the user is required not to click the sub-image (i.e. the sub-image sample) during authentication based on the clicking type CAPTCHA code accompanied by prompt information which is the prompt information sample, that is, the sub-image mismatches the prompt information.

For example, the third mapping type may be defined as "NOT MAPPED", thus if the mapping type of a sub-image sample, which corresponds to a prompt information sample, is the third mapping type, the mapping between the sub-image and the prompt information has not been defined.

For example, the fourth mapping type may be defined as "NOT APPLICABLE", thus if the mapping type of a sub-image sample, which corresponds to a prompt information sample, is the fourth mapping type, the sub-image and the prompt information should not be included in the same clicking type CAPTCHA code.

It should be understood that the names and the definitions of the four mapping types can be exchanged, for example, the first mapping type may be defined as "NO", the second mapping type may be defined as "YES", and so on. The implementations of the present disclosure are not limited to the definitions described here.

In the present embodiment of the disclosure, the prompt information in the clicking type CAPTCHA code may be a choice question or description of an affair or an object.

The server 200 selects a plurality of sub-image samples from the CAPTCHA code database as the plurality of sub-images of the CAPTCHA code according to the selected prompt information sample. Here, the mapping types of the selected sub-image samples corresponding to the selected prompt information sample may be the first mapping type or the second mapping type, and the mapping type of at least one of the selected sub-image samples corresponding to the selected prompt information sample is the first mapping type.

If the server 200 selects a prompt information sample A from the CAPTCHA code database as the prompt information of the CAPTCHA code, and then randomly selects a plurality of sub-image samples B from the CAPTCHA code database as the plurality of sub-images of the CAPTCHA code based on the selected prompt information sample A, any of the mapping types of the plurality of sub-images samples B, which correspond to the prompt information sample A, may be the first mapping type or the second mapping type, but the mapping type of at least one of the selected sub-image samples B, which corresponds to the selected prompt information sample A, is the first mapping type.

In view of the above definition of the mapping types, that is, at least one of the plurality of sub-images of the CAPTCHA code matches the prompt information, and the remaining sub-images may not match the prompt information or may not yet be mapped to the prompt information. Of course, any sub image, the mapping type of which is the fourth mapping type, will not be selected as the sub-image of the CAPTCHA code because the sub-image sample provided with the fourth mapping type cannot be included within the same CAPTCHA code with the prompt information sample.

At Step S402, the server 200 splices the plurality of sub-images corresponding to each piece of prompt information to form different first CAPTCHA images according to different splicing rules, and each CAPTCHA code includes one first CAPTCHA image and the prompt information corresponding the first CAPTCHA image.

Figure 7:
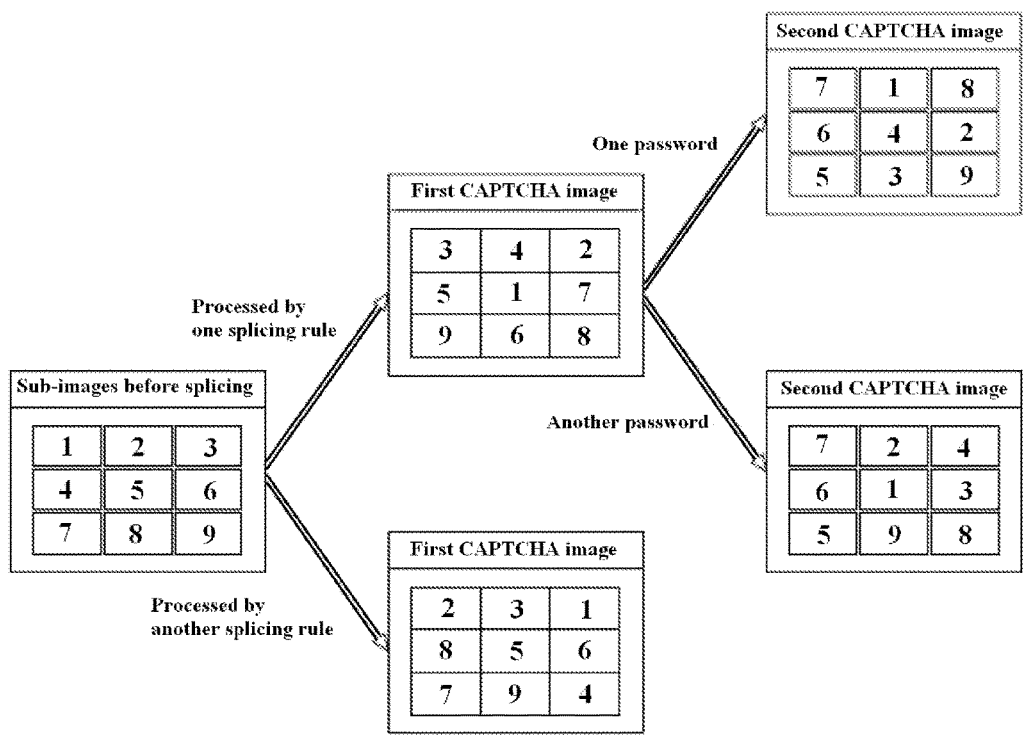
FIG. 7 is a schematic diagram showing principles for generating a first CAPTCHA image and forming a second CAPTCHA image by dividing the first CAPTCHA image and re-arranging the divided first CAPTCHA image according to the embodiment of the disclosure.

Referring FIG. 7, if the server 200 selects 9 sub-image samples (e.g. the 9 leftmost sub-images in FIG. 7) according to the prompt information sample, the server 200 randomly labels the 9 selected sub-image samples and splices the 9 sub-image samples to form different first CAPTCHA images according to different splicing rules. For example, the 9 leftmost sub-images in FIG. 7 are spliced to form two first CAPTCHA images located in the middle of FIG. 7 according to two different splicing rules.

Each CAPTCHA code sent to the user equipment includes one first CAPTCHA image and the prompt information corresponding to the first CAPTCHA image.

The server 200 further generates a correspondence relation table for the CAPTCHA code. The correspondence relation table includes the prompt information identifier of the prompt information of each CAPTCHA code, the label of each sub-image of the first CAPTCHA image of each CAPTCHA code, and the sub-image identifier of each sub-image. The correspondence relation table may further include the mapping type of each sub-image.

Each CAPTCHA code may be provided with one CAPTCHA code identifier for uniquely identifying the CAPTCHA code. The CAPTCHA code identifier may also be stored in the correspondence relation table.

At Step S403, the server 200 generates one or more passwords corresponding to each CAPTCHA code, and stores a plurality of the CAPTCHA codes and the one or more passwords corresponding to each of the CAPTCHA codes in a buffer pool. The password includes a dividing rule and an arranging rule for the plurality of sub-images of the CAPTCHA code.

The dividing rule contained in the password includes a length and a width of each sub-image and a manner of splicing the plurality of sub-images to form the first CAPTCHA image, such as a manner of splicing the plurality of sub-images on a line along the horizontal direction. The arranging rule contained in the password can be designed according to the way of presenting the CAPTCHA code at the user equipment 100. If the way of presenting the CAPTCHA code at the user equipment 100 is to present the CAPTCHA code in a 3×3 sudoku image form, the arranging rule may be designed in such a way that: 1) rows of sub-images arranged in the sudoku image form are sequentially connected, and positions of the sub-images are sequentially assigned with numbers 1 to 9, respectively; 2) each of the plurality of sub-images forming the first CAPTCHA image is assigned with one of numbers 1 to 9 sequentially according to the manner of splicing the plurality of sub-images to form the first CAPTCHA image; and 3) target positions of the sub-images numbered as 1 to 9 in the second CAPTCHA image are sequentially assigned with numbers such as 756894321, that is, the sub-image numbered as 1 will be placed at a position numbered as 7 in the second CAPTCHA image, the sub-image numbered as 2 will be placed at a position numbered as 5 in the second CAPTCHA image, and so on.

Therefore, if the CAPTCHA code is presented at the user equipment 100 in a 3×3 sudoku image form, the arranging rule contained in the password includes the sequence numbers of positions in the sudoku image, the sequence numbers of the sub-images, and the sequence number of the target position of each sub-image in the second CAPTCHA image.

It should be noted that the CAPTCHA code designed in the sudoku image form described above is just an example to disclose the disclosure more clearly, in other embodiments, CAPTCHA codes designed in other forms can be used, without departing from the protection scope of the present disclosure.

At Step S404, when receiving the CAPTCHA code acquiring request from the user equipment 100, the server 200 randomly selects a CAPTCHA code and a password corresponding to the selected CAPTCHA code according to the CAPTCHA code acquiring request.

Since the plurality of sub-images for the CAPTCHA code have been spliced into the first CAPTCHA image, the number of CAPTCHA image acquiring request to be processed by the server 200 in the authentication process is reduced to the same level as that of the conventional CAPTCHA code. For example, if 9 sub-images are needed to be sent to the user equipment 100 for each conventional clicking type CAPTCHA code, the server 200 will receives 9 CAPTCHA code acquiring requests (more particularly 9 CAPTCHA image acquiring requests) sent by the user equipment 100 in one authentication process. However, in the identity authentication method of the present embodiment, since the 9 sub-images are spliced into one first CAPTCHA image, the server 200 only processes one CAPTCHA code acquiring request, thereby reducing the stress of the server 200 without affecting the normal use by the user.

At Step S405, the server 200 sends the selected CAPTCHA code and password as well as the identifier of the CAPTCHA code to the user equipment 100, and marks the sent password as sent to the user equipment.

In this step, the server 200 sends the identifier of the CAPTCHA code, the selected CAPTCHA code (including the first CAPTCHA image and the prompt information), and the password (including the dividing rule and the arranging rule) corresponding to the selected CAPTCHA code to the user equipment 100. Herein, the identifier of the CAPTCHA code may be the identifier of the first CAPTCHA image.

In the sending process, the server 200 may further sends the identifier of the prompt information in the CAPTCHA code to the user equipment 100 or sends the labels of the sub-images in the CAPTCHA code to the user equipment 100, or sends the correspondence relation table of the CAPTCHA code to the user equipment 100.

At Step S406, the user equipment 100 divides the plurality of sub-images of the first CAPTCHA image in the CAPTCHA code according to a dividing rule, and rearranges the plurality of divided sub-images to form the second CAPTCHA image according to an arranging rule, and presents the second CAPTCHA image to the user.

Each password corresponds (i.e. contains) one dividing rule and one arranging rule, but two different passwords may correspond to the same dividing rule and arranging rule or correspond to different dividing rules and arranging rules. Referring again to FIG. 7, if the same first CAPTCHA image corresponds to two passwords with different dividing rules and arranging rules, the second CAPTCHA images formed from the first CAPTCHA image according to the two passwords are different.

At Step S407, the user equipment 100 sends authentication response information inputted by a user according to the second CAPTCHA image, the password, and the identifier of the CAPTCHA code to the server 200 for authenticating. The authentication response information includes information of the sub-images selected by the user with reference to the prompt information.

According to the content of the prompt information, the user can select sub-images satisfying the content of the prompt information from the plurality of sub-images of the second CAPTCHA image. Preferably, each sub-image of the second CAPTCHA image presented in the user equipment 100 may be a widget available for clicking or checking by the user, and the user is allowed to click or check the widget by touch (e.g. with a finger) or by a mouse to select the sub-image corresponding to the widget. Of course, the user can select the sub-image corresponding to the widget by other manners, and the implementations of the present disclosure are not limited to the manners disclosed above.

The user equipment 100 returns information of the selected sub-image(s) to the server 200 according to the selection of the sub-images by the user. The information of the selected sub-image may include the labels or sub-image identifiers of the selected sub-images. Meanwhile, the user equipment 100 returns the identifier of the CAPTCHA code and the received password to the server 200.

At Step S408, the server 200 searches for the password returned by the user equipment 100 in the buffer pool.

If the server 200 searches out the returned password in the buffer pool, Step S409 is performed, namely, the server 200 checks whether the password searched out has been marked as sent to the user equipment.

If the password has been marked as sent to the user equipment, Step S410 is performed, namely, the server 200 deletes the password from the buffer pool and calculates an authentication passing value T0 according to the selected sub-images and a predetermined rule. The server 200 determines that authentication is passed if the authentication passing value T0 is larger than a first threshold value T1. Otherwise, the server 200 determines that the authentication is not passed.

If the password has not been marked as sent to the user equipment, Step S411 is performed, namely, the server 200 stops authenticating the identity of the user.

At Step S412, the server 200 returns the authentication result to the user equipment 100.

An implementation of calculating the authentication passing value T0 according to the selected sub-images and a predetermined rule will be described below. The plurality of sub-images in the CAPTCHA code are classified into a first set P1 and a second set P2 according to the mapping types of the plurality of sub-images. For example, the sub-images provided with the first mapping type are classified into the first set P1, and the sub-images provided with the second mapping type are classified into the second set P2. Since the mapping type of at least one of the plurality of sub-images in the CAPTCHA code is the first mapping type, at least one sub-image in the CAPTCHA code belongs to the first set P1. The sub-image(s) selected by the user is(are) classified into a third set P'.

The server 200 computes a first coincidence degree between the third set P' and the first set P1 and a second coincidence degree between the third set P' and the second set P2, and further computes the authentication passing value T0 according to the first coincidence degree, the second coincidence degree, and the predetermined rule. The server 200 determines that authentication on the user identity is passed if the authentication passing value T0 is larger than the first threshold values T1. Otherwise, the server 200 determines that the authentication is not passed. The predetermined rule may such that the more the first coincidence degree is larger than the second coincidence degree, the larger the authentication passing value T0 is, in contrast, the more the second coincidence degree is larger than the first coincidence degree, the smaller the authentication passing value T0 is.

Specifically, a weight of the mapping type of a sub-image sample Bi corresponding to prompt information sample Aj is represented by Ci,j. If the mapping type of the sub-image sample Bi is the first mapping type, then Ci,j is set to 1, namely Ci,j=1; if the mapping type of the sub-image sample Bi is the second mapping type, then Ci,j is set to −1, namely Ci,j=−1; if the mapping type of the sub-image sample Bi is the third mapping type, then Ci,j is set to 0, namely Ci,j=0; and if the mapping type of the sub-image sample Bi is the fourth mapping type, the processing is unchanged. If the weight of the mapping type of the sub-image in the CAPTCHA code is Ci,j=1, the sub-image belongs to the first set P1, and if the weight of the mapping type of the sub-image in the CAPTCHA code is Ci,j=−1, the sub-image belongs to the second set P2.

When computing the authentication passing value T0, if the CAPTCHA code includes a number P of sub-images, the authentication passing value T0 can be computed by formula (1) below:

$$T0 = \sum_{i=1}^{P} C_{i,j} \times K_i. \quad (1)$$

Where, Ki depends on the user selection. If the user selects the sub-image corresponding to the sub-image sample Bi, that is, the sub-image sample Bi belongs to the third set P', Ki=1; if the user does not select the sub-image corresponding to the sub-image sample Bi, that is, the sub-image sample does not belong to the third set P', Ki=−1.

The mapping types of the P sub-images in the CAPTCHA code can be looked up in the corresponding relation table of the CAPTCHA code according to the identifier of the CAPTCHA code returned by the user equipment 100. Whether the sub-image corresponding to the sub-image sample Bi is selected by the user can be determined by the information of the selected sub-images returned by the user equipment 100. Specifically, if the information of the selected sub-image includes a label of the selected sub-image, the sever 200 may look up the sub-image samples corresponding to the labels in the correspondence relation table of the CAPTCHA code to determine whether the selected image includes the sub-image sample Bi; if the information of the selected image includes the sub-image identifier of the selected sub-image, the server 200 may directly determines whether the selected sub-image includes the sub-image sample Bi according to the sub-image identifier.

The server 200 compares the computed authentication passing value T0 with the preset first threshold T1. If the authentication passing value T0 is above the first threshold T1, the server 200 determines the authentication is passed, otherwise, the server determines the authentication is not passed.

It should be noted that the clicking type CAPTCHA code is taken for example in the present embodiment to describe the present disclosure in detail, but the implementations of the present disclosure are not limited to the above example, and the present disclosure can be applied to all the CAPTCHA codes with a plurality of sub-images.

In the embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200. In addition, the password is disposable, the replay attack can be effectively resisted.

Figure 8:
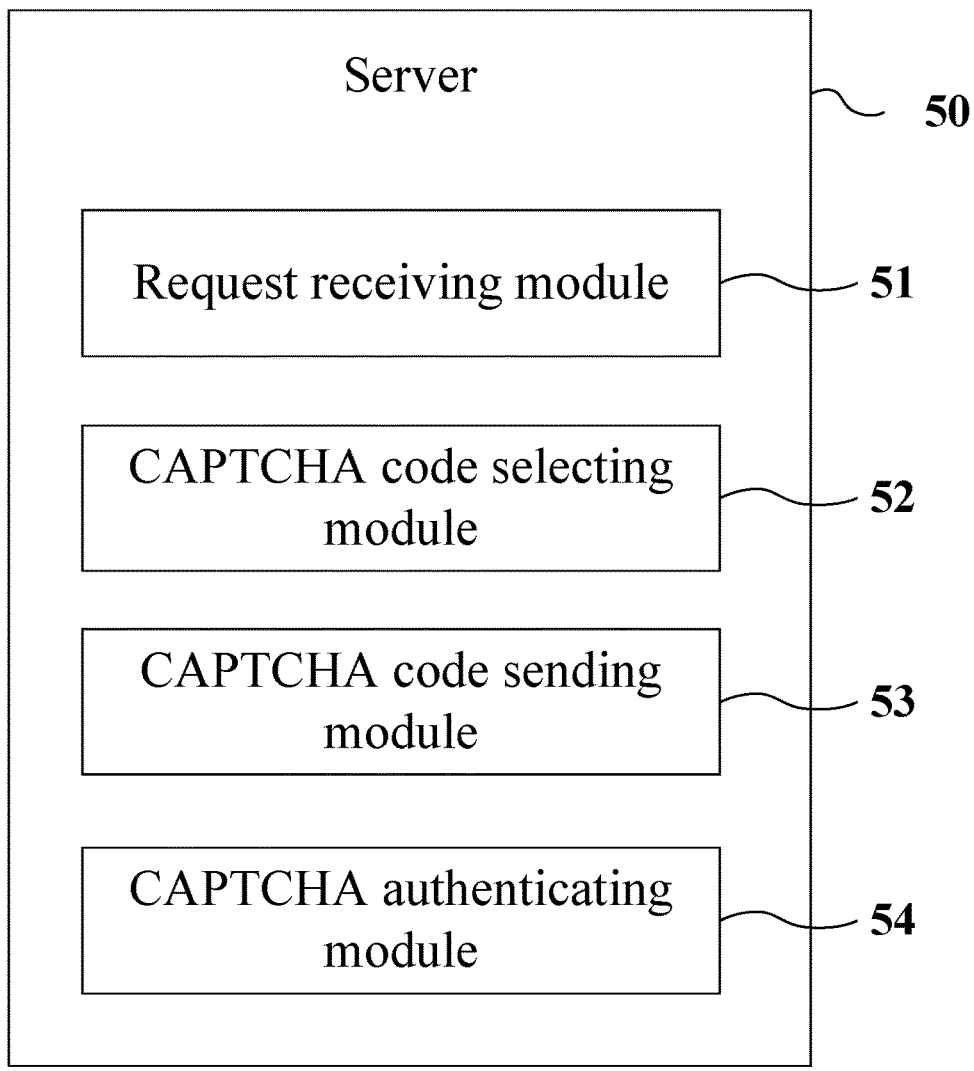
FIG. 8 is a schematic structural diagram of a server according to a fifth embodiment of the disclosure.

FIG. 8 is a schematic structural diagram of a server according to a fifth embodiment of the disclosure. Referring to FIG. 8, the server 50 of the present embodiment may be used to implement the identity authentication method of the first or second embodiment. The server 50 of the present embodiment includes a request receiving module 51, a CAPTCHA code selecting module 52, a CAPTCHA code sending module 53, and a CAPTCHA authenticating module 54.

The request receiving module 51 is configured to receive a CAPTCHA code acquiring request sent by the user equipment 100.

The CAPTCHA code selecting module 52 is configured to randomly select a CAPTCHA code and a password corresponding to the selected CAPTCHA code as per the CAPTCHA code acquiring request. The CAPTCHA code includes a first CAPTCHA image formed by a plurality of spliced sub-images, and the password includes a preset processing rule for the plurality of sub-images.

The CAPTCHA code sending module 53 is configured to send the selected CAPTCHA code and password to the user equipment 100, so that the user equipment 100 rearranges positions of the plurality of sub-images of the first CAPTCHA image in the CAPTCHA code to form a second CAPTCHA image according to the preset processing rule contained in the password, and presents the second CAPTCHA image to a user.

The CAPTCHA authenticating module 54 is configured to receive, from the user equipment 100, authentication response information inputted by a user according to the second CAPTCHA image, and authenticate an identity of the user according to the authentication response information.

Further, the preset processing rule contained in the password includes a dividing rule and an arranging rule for the plurality of sub-images.

The above modules may be achieved by software and stored in the storage of the server 50. The above modules may alternatively be achieved by hardware (e.g. integrated circuit chips). Or, the above modules may also be achieved by combinations of software and hardware.

It should be noted that the functions of the modules of the server 50 of the present embodiment can be implemented by the corresponding method embodiment described above. The specific implementation of the functions can refer to the related description of the corresponding method embodiment described above and will not be repeated herein.

In the embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200.

Figure 9:
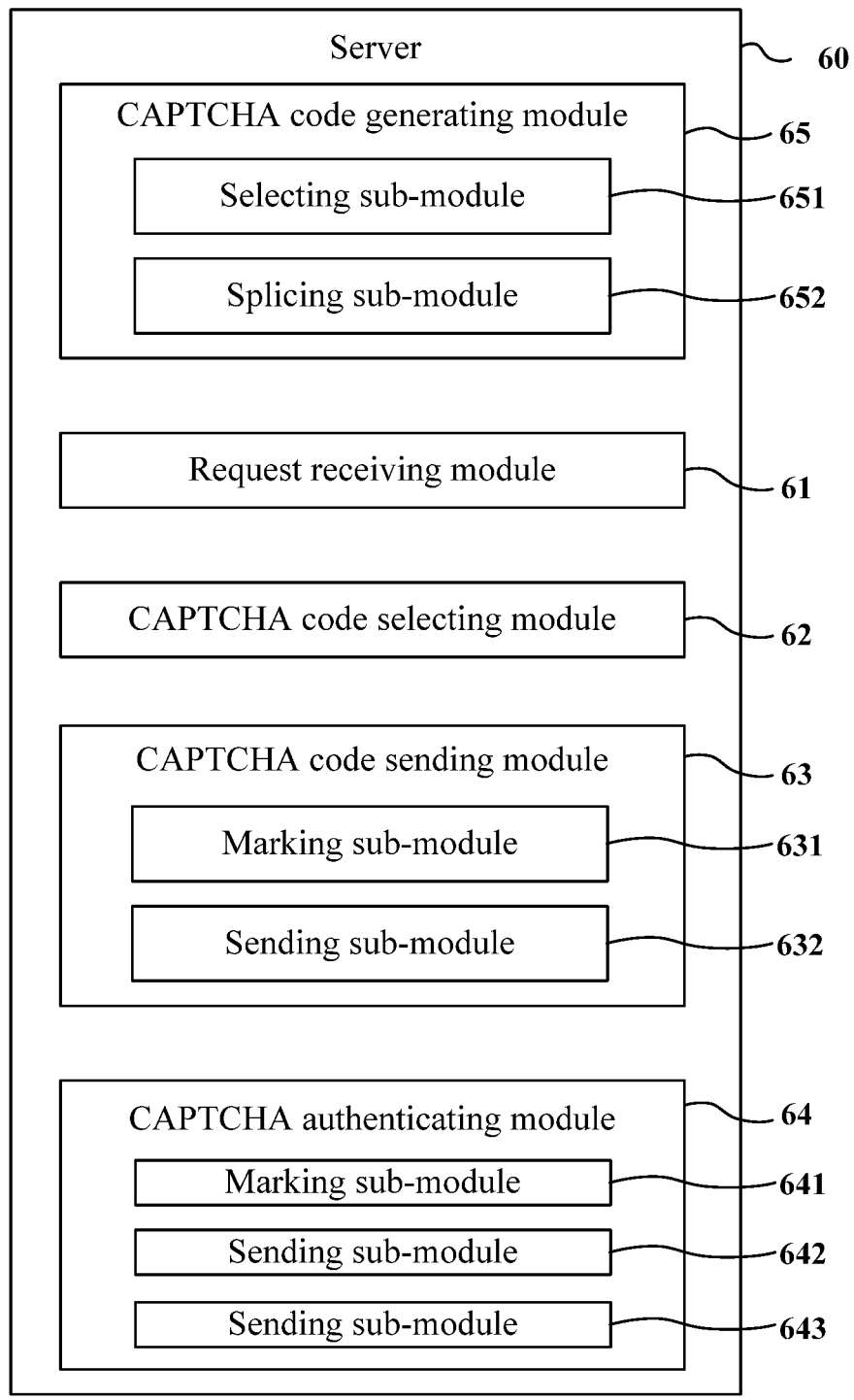
FIG. 9 is a schematic structural diagram of a server according to a sixth embodiment of the disclosure.

FIG. 9 is a schematic structural diagram of a server according to a sixth embodiment of the disclosure. Referring to FIG. 9, a server 60 of the present embodiment may be used to implement the identity authentication method of the first or second embodiment. The server 60 of the present embodiment includes a request receiving module 61, a CAPTCHA code selecting module 62, a CAPTCHA code sending module 63, and a CAPTCHA authenticating module 64.

The request receiving module 61 is configured to receive a CAPTCHA code acquiring request sent by the user equipment 100.

The CAPTCHA code selecting module 62 is configured to randomly select a CAPTCHA code and a password corresponding to the selected CAPTCHA code as per the CAPTCHA code acquiring request. The CAPTCHA includes a first CAPTCHA image formed by a plurality of spliced sub-images, and the password includes a dividing rule and an arranging rule for the plurality of sub-images.

The CAPTCHA code sending module 63 is configured to send the selected CAPTCHA code and password to the user equipment 100, so that the user equipment 100 divides the plurality of sub-images of the first CAPTCHA image in the CAPTCHA code according to the dividing rule, rearranges the plurality of divided sub-images according to the arranging rule to form a second CAPTCHA image, and presents the second CAPTCHA image to a user.

The CAPTCHA authenticating module 64 is configured to receive, from the user equipment 100, authentication response information inputted by the user according to the second CAPTCHA image, and authenticate an identity of the user according to the authentication response information.

Further, in the present embodiment, the server 60 further includes a CAPTCHA code generating module 65, which is configured to generate a plurality of CAPTCHA codes and one or more passwords corresponding to each of the CAPTCHA code, and store the plurality of CAPTCHA codes and the corresponding passwords in a buffer pool.

The CAPTCHA code generating module 65 includes a selecting sub-module 651 and a splicing sub-module 652. The selecting sub-module 651 is configured to select a plurality of pieces of prompt information from a database, and select a plurality of sub-images corresponding to each piece of prompt information. The splicing sub-module 652 is configured to splice the plurality of the sub-images corresponding to each piece of prompt information to form one or more first CAPTCHA images. Each of the CAPTCHA codes includes one first CAPTCHA image and the prompt information corresponding to the first CAPTCHA image.

Further, in the present embodiment, the CAPTCHA code sending module 63 includes a marking sub-module 631 and a sending sub-module 632. The marking sub-module 631 is configured to mark the selected password as sent to the user equipment. The sending sub-module 632 is configured to send the selected CAPTCHA code and password to the user equipment.

Further, in the present embodiment, the CAPTCHA authenticating module 64 includes a receiving sub-module 641, a searching sub-module 642, and an authenticating sub-module 643. The receiving sub-module 641 is configured to receive the authentication response information and the password returned from the user equipment. The searching sub-module 642 is configured to search for the returned password in the buffer pool, and check whether the returned password has been marked as sent to the user equipment if the returned password is searched out. The authenticating sub-module 643 is configured to: if the password searched out by the searching sub-module 642 has been marked as sent to the user equipment, authenticate the identity of the user based on preset authentication answer information and the authentication response information inputted by the user and delete the password from the buffer pool; if the password searched out by the searching sub-module 642 has not been marked as sent to the user equipment, stop authenticating the identity of the user; and if the returned password is not searched out, stop authenticating the identity of the user.

Further, the CAPTCHA code includes prompt information related to the plurality of sub-images of the first CAPTCHA image, and the authentication response information includes information of sub-images selected by the user according to the prompt information.

Further, the CAPTCHA authenticating module 64 is specifically configured to compute an authentication passing value T0 according to the information of the selected sub-images and a predetermined rule, determine that the authentication is passed if the authentication passing value T0 is above a first threshold value T1, and otherwise determine the authentication is not passed.

The above modules may be achieved by software and stored in the storage of the server 60. The above modules may be alternatively achieved by hardware (e.g. integrated circuit chips). Or, the above modules may be achieved by combinations of software and hardware.

It should be noted that the functions of the modules of the server 60 of the present embodiment can be implemented by the corresponding method embodiment described above. The specific implementation of the functions may refer to the related description of the corresponding method embodiment described above and will not be repeated herein.

It should be noted that all the steps in the present embodiment can be performed by one server or a number of servers. For example, a CAPTCHA code generating server may be configured to generate CAPTCHA codes, a CAPTCHA image splicing server may be configured to splice a plurality of sub-images to form the first CAPTCHA image, a password generating server may be configured to generate a password corresponding to the CAPTCHA code, a CAPTCHA code sending server may be configured to send the CAPTCHA code, and so on. Accordingly, the first CAPTCHA image, the password, and the sub-images may be respectively placed in different buffer pools, and the number of the servers and the configuration of the buffer pools may be varied with the specific environment and the specific conditions, without departing from the protection scope of the present disclosure.

In the embodiment of the disclosure, after receiving the CAPTCHA code acquiring request, the sever 200 randomly selects the CAPTCHA code containing the first CAPTCHA image formed by a plurality of spliced sub-images and the password corresponding to the CAPTCHA code, and sends the CAPTCHA code and the password to the user equipment 100, so that the user equipment 100 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 100 each time may be different, even the same first CAPTCHA image is used, the rearranged positions of the sub-images in the second CAPTCHA image can be changed as long as the password is different. As such, the server 200 can send the first CAPTCHA image containing the plurality of sub-images once receiving the CAPTCHA code acquiring request, thereby significantly reducing the work load of the server 200 and improving the process efficiency of the server 200. Further, in the embodiment of the disclosure, the rearrangement of the positions of the plurality of sub-images is performed at the user equipment 100 according to the password sent by the server 200, the work load of the server 200 can be further reduced because sending the password only consumes few resources of the server 200. In addition, the password is disposable, the replay attack can be effectively resisted.

Figure 10:
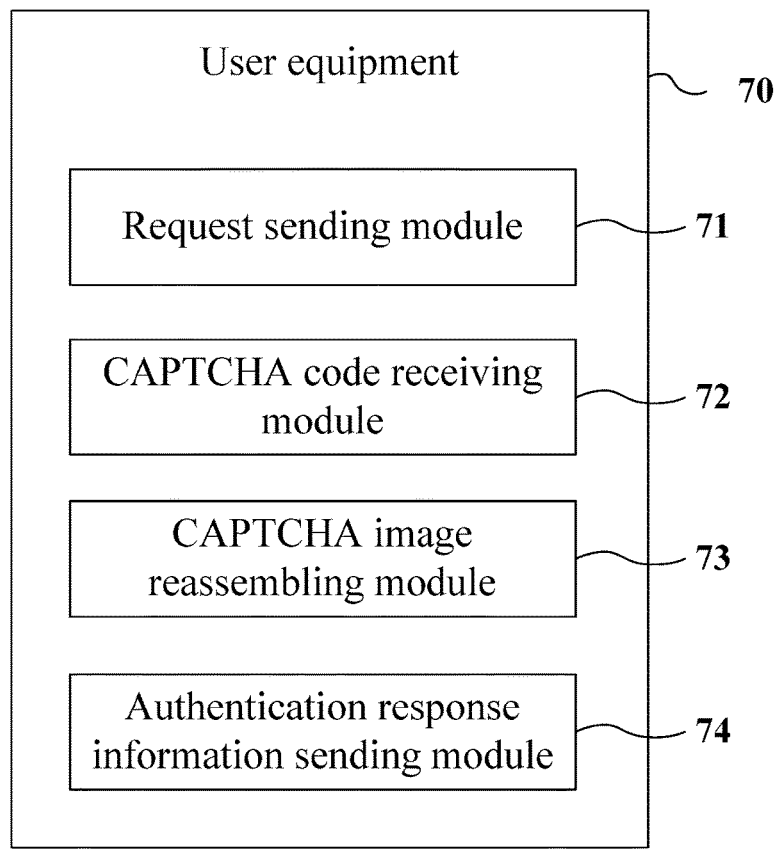
FIG. 10 is a schematic structural diagram of a user equipment according to a seventh embodiment of the disclosure.

FIG. 10 is a schematic structural diagram of a user equipment according to a seventh embodiment of the disclosure. Referring to FIG. 10, the user equipment 70 provided in the present embodiment is used to implement the identity authentication method of the third embodiment. The user equipment 70 includes a request sending module 71, a CAPTCHA code receiving module 72, a CAPTCHA image reassembling module 73, and an authentication response information sending module 74.

The request sending module 71 is configured to send a CAPTCHA code acquiring request to a server 200.

The CAPTCHA code receiving module 72 is configured to receive a CAPTCHA code and a password corresponding to the CAPTCHA code from the server. The CAPTCHA code includes a first CAPTCHA image formed by a plurality of spliced sub-images, and the password includes a preset processing rule for the plurality of sub-images.

The CAPTCHA image reassembling module 73 is configured to rearrange positions of the plurality of sub-images of the first CAPTCHA image in the CAPTCHA code to form a second CAPTCHA image according to the preset processing rule contained in the password and present the second CAPTCHA image to a user.

The authentication response information sending module 74 is configured to send authentication response information inputted by the user according to the second CAPTCHA image to the server 200 for authenticating.

Further, the preset processing rule contained in the password includes a dividing rule and an arranging rule for the plurality of sub-images.

The CAPTCHA image reassembling module 73 specifically is configured to divide the plurality of sub-images of the first CAPTCHA image in the CAPTCHA code according to the dividing rule contained in the password, rearrange the plurality of divided sub-images according to the arranging rule to form the second CAPTCHA image, and present the second CAPTCHA image to the user.

The above modules may be embodied by software and stored in the storage of the server 50 when achieved by software code. The above modules may be alternatively implemented by hardware (e.g. integrated circuit chips). Or, the above modules may be implemented by combinations of the software and hardware.

It should be noted that the functions of the modules of the user equipment 70 of the present embodiment can be implemented by the corresponding method embodiment described above. The specific implementations can refer to the related description of the corresponding method embodiment described above and will not be repeated herein.

In the embodiment of the disclosure, after receiving the CAPTCHA code acquiring request, the sever 60 randomly selects the CAPTCHA code containing the first CAPTCHA image formed by a plurality of spliced sub-images and the password corresponding to the CAPTCHA code, and sends the CAPTCHA code and the password to the user equipment 70, so that the user equipment 70 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 70 each time may be different, even the same first CAPTCHA image is used, the rearranged positions of the sub-images in the second CAPTCHA image can be changed as long as the password is different. As such, the server 60 can send the first CAPTCHA image containing the plurality of sub-images once receiving the CAPTCHA code acquiring request, thereby significantly reducing the work load of the server 60 and improving the process efficiency of the server 60. Further, in the embodiment of the disclosure, the rearrangement of the positions of the plurality of sub-images is performed at the user equipment 70 according to the password sent by the server 60, the work load of the server 60 can be further reduced because sending the password only consumes few resources of the server 60.

Figure 11:
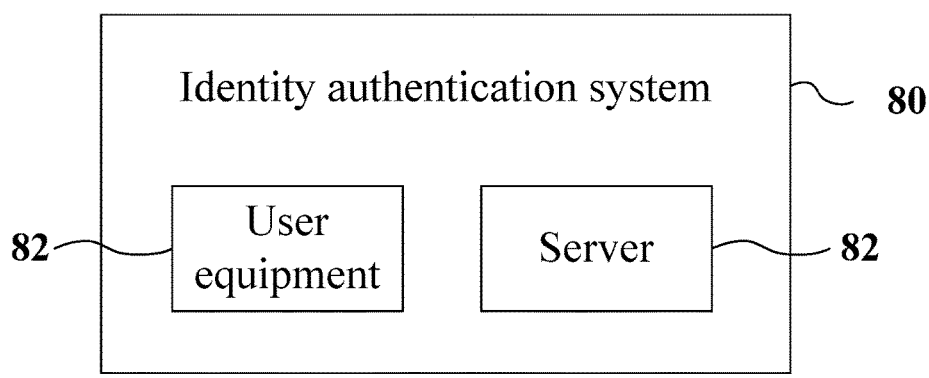
FIG. 11 is a schematic structural diagram of an identity authentication system according to an eighth embodiment of the disclosure.

FIG. 11 is a schematic structural diagram of an identity authentication system according to an eighth embodiment of the disclosure. Referring to FIG. 11, an identity authentication system 80 of the present embodiment is used to implement the identity authentication method provided in the fourth embodiment. The identity authentication system 80 of the present embodiment includes a user equipment 81 and a server 82.

The user equipment 81 is configured to: send a CAPTCHA code acquiring request to the server 82; receive a CAPTCHA code and a password corresponding to the CAPTCHA code from the server 82, where the CAPTCHA code includes a first CAPTCHA image formed by a plurality of spliced sub-images, and the password includes a preset processing rule for the plurality of sub-images; rearrange positions of the plurality of sub-images of the first CAPTCHA image in the CAPTCHA code according to the preset processing rule contained in the password to form a second CAPTCHA image and present the second CAPTCHA image to a user; and send authentication response information, which is inputted by the user according to the second CAPTCHA image, to the server 82 for authenticating.

The server 82 is configured to: receive a CAPTCHA code acquiring request sent by the user equipment 81; randomly select a CAPTCHA code and a password corresponding to the selected CAPTCHA code as per the CAPTCHA code acquiring request, where the CAPTCHA code includes a first CAPTCHA image formed by a plurality of spliced sub-images, and the password includes a dividing rule and an arranging rule for the plurality of sub-images; send the selected CAPTCHA code and password to the user equipment 81, so that the user equipment 81 divides the plurality of sub-images of the first CAPTCHA image in the CAPTCHA code according to the dividing rule, rearranges the plurality of divided sub-images according to the arranging rule to form a second CAPTCHA image and presents the second CAPTCHA image to a user; receive, from the user equipment 81, authentication response information inputted by the user according to the second CAPTCHA image; authenticate an identity of the user according to the authentication response information; and return an authenticate result to the user equipment 81.

In the embodiment of the disclosure, after receiving the CAPTCHA code acquiring request, the sever 82 randomly selects the CAPTCHA code containing the first CAPTCHA image formed by a plurality of spliced sub-images and the password corresponding to the CAPTCHA code, and sends the CAPTCHA code and the password to the user equipment 81, so that the user equipment 81 divides and then rearranges the plurality of sub-images forming the first CAPTCHA image according to the dividing rule and the rearranging rule contained in the password to form the second CAPTCHA image and then presents the second CAPTCHA image to the user. Because the password sent to the user equipment 81 each time may be different, even the same first CAPTCHA image is used, the rearranged positions of the sub-images in the second CAPTCHA image can be changed as long as the password is different. As such, the server 82 can send the first CAPTCHA image containing the plurality of sub-images once receiving the CAPTCHA code acquiring request, thereby significantly reducing the work load of the server 82 and improving the process efficiency of the server 82. Further, in the embodiment of the disclosure, the rearrangement of the positions of the plurality of sub-images is performed at the user equipment 81 according to the password sent by the server 82, the work load of the server 82 can be further reduced because sending the password only consumes few resources of the server 82. In addition, the password is disposable, the replay attack can be effectively resisted.

The present embodiment provides a storage medium including computer-executable instructions configured to perform an identity authentication method when executed by a computer processor. The method includes:

receiving a CAPTCHA code acquiring request from a user equipment;

randomly selecting a CAPTCHA code and a password corresponding to the selected CAPTCHA code as per the CAPTCHA code acquiring request, where the CAPTCHA code includes a first CAPTCHA image formed by a plurality of spliced sub-images and the password includes a preset processing rule for the plurality of sub-images;

sending the selected CAPTCHA code and password to the user equipment, so that the user equipment rearranges positions of the plurality of sub-images of the first CAPTCHA image in the CAPTCHA code to form a second CAPTCHA image according to the preset processing rule contained in the password, and presents the second CAPTCHA image to a user; and receiving, from the user equipment, authentication response information inputted by a user according to the second CAPTCHA image, authenticating an identity of the user according to the authentication response information, and returning an authentication result to the user equipment.

The method specifically includes the identity authentication method performed by the server provided by any one of the embodiments of the disclosure.

The present embodiment provides a storage medium including computer-executable instructions configured to perform an identity authentication method when executed by a computer processor. The method includes:

sending a CAPTCHA code acquiring request to a server;
receiving a CAPTCHA code and a password corresponding to the CAPTCHA code, where the CAPTCHA code includes a first CAPTCHA image formed by a plurality of spliced sub-images and the password includes a preset processing rule for the plurality of sub-images;
rearranging positions of the plurality of sub-images of the first CAPTCHA image in the CAPTCHA code to form a second CAPTCHA image according to the preset processing rule contained in the password and presenting the second CAPTCHA image to a user; and
sending authentication response information inputted by a user according to the second CAPTCHA image to the server for authenticating.

The method specifically includes the identity authentication method performed by the user equipment provided by any one of the embodiments of the disclosure.

It should be noted that all the embodiments of the present disclosure are described in a progressive manner. Each embodiment emphasizes on the content different from the other embodiments, thus similar parts and the same parts among these embodiments can be referred each other. The device embodiments are described briefly because they are substantially similar to the method embodiment and the related parts can refer to the corresponding parts of the method embodiment. It should be noted herein that the terms "comprising", "including", or any other variants mean to cover the non-exclusive inclusion, so that the process, method, object, or device including a series of elements not only includes those elements, but also includes other elements which are not listed, or the inherent elements. Without explicit limitations, the element defined by a sentence like "including a . . . " does not exclude that the process, method, object, or device including this element further includes other elements.

It would be appreciated by the person skilled in this art that all the steps or a part of steps for achieving the above described embodiments can be implemented by hardware or by hardware instructed by program instructions. The program may be stored in a computer readable storage medium, which may be a read only memory, a magnetic disk, or an optical disc.

The above are only preferred specific embodiments of the present invention, and not intended to limit the invention in any way. The preferred embodiments described as above for disclosing the invention should not be regarded as limitations to the invention. A person having ordinary skills in the art can make improvements and modifications to the embodiments in light of the above technical disclosures within the scope of the invention. The improvements and modifications made without departing from the scope of the invention fall within the scope of the invention.

What is claimed is:

1. An identity authentication method comprising:
generating a plurality of CAPTCHA codes;
generating, for each of the plurality of CAPTCHA codes, one or more corresponding passwords;
storing the plurality of CAPTCHA codes and the corresponding passwords, wherein generating a first CAPTCHA code of the plurality of CAPTCHA codes comprises:
selecting a plurality of pieces of prompt information from a database;
selecting a plurality of sub-images corresponding respectively to the plurality of pieces of prompt information; and
splicing the plurality of sub-images into a CAPTCHA image according to a preset splicing rule,
wherein the first CAPTCHA code includes the CAPTCHA image and the plurality of pieces of prompt information;
receiving a first request from a user equipment; and
in response to receiving the first request:
randomly selecting a CAPTCHA code from the plurality of CAPTCHA codes based on the first request, wherein the selected CAPTCHA code includes a first CAPTCHA image formed by a plurality of spliced sub-images
randomly selecting one of the one or more passwords corresponding to the selected CAPTCHA code, wherein the selected password includes a preset processing rule for the plurality of spliced sub-images;
sending the selected CAPTCHA code and the selected password to the user equipment to cause the user equipment to (i) rearrange positions of the plurality of spliced sub-images of the first CAPTCHA image in the selected CAPTCHA code to form a second CAPTCHA image according to the preset processing rule contained in the selected password and (ii) present the second CAPTCHA image to a user;
receiving, from the user equipment, authentication response information inputted by the user according to the second CAPTCHA image; and
in response to receiving the authentication response information, (i) authenticating an identity of the user according to the authentication response information and (ii) returning an authentication result to the user equipment.

2. The method according to claim 1, wherein the preset processing rule contained in the selected password comprises a dividing rule and an arranging rule for the plurality of spliced sub-images.

3. The method according to claim 1, wherein the sending the selected CAPTCHA code and the selected password to the user equipment comprises:
marking the selected password as sent to the user equipment; and
sending the selected CAPTCHA code and the selected password to the user equipment.

4. The method according to claim 3, further comprising:
in response to receiving the authentication response information, receiving the selected password from the user equipment,
wherein the authenticating the identity of the user according to the authentication response information includes:
searching for the received password in a buffer pool;
checking whether the received password has been marked as sent to the user equipment if the password is searched out, authenticating the identity of the user based on preset authentication answer information and the received authentication response information and deleting the received password from the buffer pool, if the received password has been marked as sent to the user equipment, and stop authenticating the identity of the user if the received password has not been marked as sent to the user equipment; and stop authenticating the identity of the user if the received password is not searched out.

5. The method according to claim 1, wherein:
each of the plurality of CAPTCHA codes further includes prompt information related to the plurality of sub-images of the first CAPTCHA image; and
the authentication response information includes information of one or more sub-images selected by the user according to the prompt information.

6. The method according to claim 5, wherein the authenticating the identity of the user according to the authentication response information comprises:
computing an authentication passing value T0 according to information of the selected one or more sub-images and a predetermined rule, and
determining that the authentication is passed if the authentication passing value T0 is above a first threshold value T1, otherwise, determining that the authentication is not passed.

7. An identity authentication method that is performed by a system comprising a user equipment and a server, the method comprising:
generating, by the server, a plurality of CAPTCHA codes;
generating, by the server, for each of the plurality of CAPTCHA codes, one or more corresponding passwords;
storing, by the server, the plurality of CAPTCHA codes and the corresponding passwords into a buffer pool,
wherein generating a first CAPTCHA code of the plurality of CAPTCHA codes comprises:
selecting, by the server, a plurality of pieces of prompt information from a database,
selecting, by the server, a plurality of sub-images corresponding respectively the plurality of pieces of prompt information; and
splicing, by the server, the plurality of sub-images into a CAPTCHA image according to a preset splicing rule,
wherein the first CAPTCHA code includes the CAPTCHA image and the plurality of pieces of prompt information;
receiving, by the server, a first request; and
in response to receiving the first request:
randomly selecting, by the server, a CAPTCHA code from the plurality of CAPTCHA codes based on the first request, wherein the selected CAPTCHA code includes a first CAPTCHA image formed by a plurality of spliced sub-images
randomly selecting, by the server, one of the one or more passwords corresponding to the selected CAPTCHA code, wherein the selected password includes a preset processing rule for the plurality of spliced sub-images;
rearranging, by the user equipment, positions of the plurality of spliced sub-images of the first CAPTCHA image in the selected CAPTCHA code to form a second CAPTCHA image according to the preset processing rule contained in the selected password and presenting the second CAPTCHA image to a user; and
sending, by the user equipment, authentication response information inputted by the user according to the second CAPTCHA image to the server for authenticating.

8. The method according to claim 7, wherein:
the preset processing rule contained in the selected password comprises a dividing rule and an arranging rule for the plurality of spliced sub-images; and
the rearranging positions of the plurality of spliced sub-images of the first CAPTCHA image in the selected CAPTCHA code to form the second CAPTCHA image according to the preset processing rule contained in the selected password comprises:
dividing, by the user equipment, the plurality of spliced sub-images of the first CAPTCHA image in the CAPTCHA code according to the dividing rule, and
rearranging, by the user equipment, the plurality of divided sub-images according to the arranging rule to form the second CAPTCHA image.

9. An identity authentication device, running on a server, the device comprising:
a CAPTCHA code generating module configured to generate a plurality of CAPTCHA codes and one or more passwords corresponding to each of the CAPTCHA codes and store the plurality of CAPTCHA codes and the corresponding passwords into a buffer pool, wherein the CAPTCHA code generating module comprises:
a selecting sub-module configured to select a plurality of pieces of prompt information from a database, and select a plurality of sub-images corresponding to each of the plurality of pieces of prompt information; and
a splicing sub-module configured to splice the plurality of sub-images corresponding to each of the plurality of pieces of prompt information into one or more first CAPTCHA images according to a preset splicing rule, wherein each of the CAPTCHA codes comprises a first CAPTCHA image and the prompt information corresponding to the first CAPTCHA image;
a request receiving module configured to receive a CAPTCHA code acquiring request from a user equipment;
a CAPTCHA code selecting module configured to randomly select a CAPTCHA code and a password corresponding to the selected CAPTCHA code based on the CAPTCHA code acquiring request, wherein the CAPTCHA code comprises the first CAPTCHA image formed by the plurality of spliced sub-images, and the password comprises a preset processing rule for the plurality of sub-images;
a CAPTCHA code sending module configured to send the selected CAPTCHA code and password to the user equipment, so that the user equipment rearranges positions of the plurality of sub-images of the first CAPTCHA image in the CAPTCHA code to form a second CAPTCHA image according to the preset processing rule contained in the password and presents the second CAPTCHA image to a user; and
a CAPTCHA authenticating module configured to receive, from the user equipment, authentication response information inputted by the user according to the second CAPTCHA image, authenticate an identity of the user according to the authentication response information, and return an authentication result to the user equipment.

10. The device according to claim 9, wherein the preset processing rule contained in the password comprises a dividing rule and an arranging rule for the plurality of sub-images.

11. The device according to claim 9, wherein the CAPTCHA code sending module comprises:
a marking sub-module configured to mark the selected password as sent to the user equipment; and
a sending sub-module configured to send the selected CAPTCHA code and password to the user equipment.

12. The device according to claim 11, wherein the CAPTCHA authenticating module comprises:
a receiving sub-module configured to receive the authentication response information and the password returned from the user equipment;
a searching sub-module configured to search for the returned password in the buffer pool, and check whether the password has been marked as sent to the user equipment if the password is searched out; and
an authenticating sub-module configured to:
authenticate the identity of the user based on preset authentication answer information and the received authentication response information and delete the password from the buffer pool if the password searched out by the searching sub-module has been marked as sent to the user equipment;
stop authenticating the identity of the user if the password searched out by the searching sub-module has not been marked as sent to the user equipment; and
stop authenticating the identity of the user if the password is not searched out.

13. The device according to claim 9, wherein each CAPTCHA code further comprises prompt information related to the plurality of sub-images of the first CAPTCHA image in the CAPTCHA code, and the authentication response information comprises information of one or more sub-images selected by the user according to the prompt information.

14. The device according to claim 13, wherein the CAPTCHA authenticating module is configured to:
compute an authentication passing value T0 according to information of the selected sub-images and a predetermined rule; and
in response to the authentication passing value T0 being above a first threshold value T1, determine that the authentication is passed, and otherwise determine that the authentication is not passed.

15. A non-transitory storage medium comprising computer-executable instructions configured to perform an identity authentication method when executed by at least one computer processor, wherein the identity authentication method comprises:
generating a plurality of CAPTCHA codes and one or more passwords corresponding to each of the CAPTCHA codes, and storing the plurality of CAPTCHA codes and the corresponding passwords into a buffer pool, wherein the generating the plurality of CAPTCHA codes comprises:
selecting a plurality of pieces of prompt information from a database, and selecting a plurality of sub-images corresponding to each of the plurality of pieces of prompt information; and
splicing the plurality of sub-images corresponding to each of the plurality of pieces of prompt information into one or more first CAPTCHA images according to a preset splicing rule, wherein each of the CAPTCHA codes comprises a first CAPTCHA image and the prompt information corresponding to the first CAPTCHA image;
receiving a CAPTCHA code acquiring request from a user equipment;
randomly selecting a CAPTCHA code and a password corresponding to the selected CAPTCHA code based on the CAPTCHA code acquiring request, wherein the CAPTCHA code comprises the first CAPTCHA image formed by the plurality of spliced sub-images, and the password comprises a preset processing rule for the plurality of sub-images;
sending the selected CAPTCHA code and password to the user equipment, so that the user equipment rearranges positions of the plurality of sub-images of the first CAPTCHA image in the CAPTCHA code to form a second CAPTCHA image according to the preset processing rule contained in the password and presents the second CAPTCHA image to a user; and
receiving, from the user equipment, authentication response information inputted by the user according to the second CAPTCHA image, authenticating an identity of the user according to the authentication response information, and returning an authentication result to the user equipment.

16. An identity authentication system comprising a user equipment and a server, wherein the server is configured to:
generate a plurality of CAPTCHA codes and one or more passwords corresponding to each of the CAPTCHA codes, and store the plurality of CAPTCHA codes and the corresponding passwords into a buffer pool, wherein the server is configured to generate the plurality of CAPTCHA codes by:
selecting a plurality of pieces of prompt information from a database, and selecting a plurality of sub-images corresponding to each of the plurality of pieces of prompt information; and
splicing the plurality of sub-images corresponding to each of the plurality of pieces of prompt information into one or more first CAPTCHA images according to a preset splicing rule, wherein each of the CAPTCHA codes comprises a first CAPTCHA image and the prompt information corresponding to the first CAPTCHA image;
receive a CAPTCHA code acquiring request from the user equipment;
randomly select a CAPTCHA code and a password corresponding to the selected CAPTCHA code based on the CAPTCHA code acquiring request, wherein the CAPTCHA code comprises the first CAPTCHA image formed by the plurality of spliced sub-images, and the password comprises a preset processing rule for the plurality of sub-images;
send the selected CAPTCHA code and password to the user equipment, so that the user equipment rearranges positions of the plurality of sub-images of the first CAPTCHA image in the CAPTCHA code to form a second CAPTCHA image according to the preset processing rule contained in the password and presents the second CAPTCHA image to a user; and
receive, from the user equipment, authentication response information inputted by the user according to the second CAPTCHA image, authenticate an identity of the user according to the authentication response information, and return an authentication result to the user equipment, wherein the user equipment is configured to:
send the CAPTCHA code acquiring request to the server;
receive the CAPTCHA code and the password corresponding to the CAPTCHA code from the server;

rearrange positions of the plurality of sub-images of the first CAPTCHA image in the CAPTCHA code to form the second CAPTCHA image according to the preset processing rule contained in the password and present the second CAPTCHA image to the user; and send authentication response information inputted by the user according to the second CAPTCHA image to the server for authenticating.

\* \* \* \* \*